United States Patent
Michael

(10) Patent No.: US 11,433,958 B2
(45) Date of Patent: Sep. 6, 2022

(54) SYSTEM AND MULTICOMPONENT APPARATUS FOR REMOVING AND INSTALLING A CONTINUOUS TRACK ON A TRACKED VEHICLE

(71) Applicant: Edgar E Michael, Verona, VA (US)

(72) Inventor: Edgar E Michael, Verona, VA (US)

( * ) Notice: Subject to any disclaimer, the term of this patent is extended or adjusted under 35 U.S.C. 154(b) by 0 days.

(21) Appl. No.: 16/916,616

(22) Filed: Jun. 30, 2020

(65) Prior Publication Data

US 2021/0403108 A1 Dec. 30, 2021

(51) Int. Cl.
*B62D 55/32* (2006.01)
*B62D 65/02* (2006.01)
*B25B 27/22* (2006.01)

(52) U.S. Cl.
CPC ............ *B62D 55/32* (2013.01); *B62D 65/02* (2013.01); *B25B 27/22* (2013.01)

(58) Field of Classification Search
CPC ........ Y10T 29/4978; B23P 6/00; B25B 27/22; B62D 55/32
See application file for complete search history.

(56) References Cited

U.S. PATENT DOCUMENTS

| | | | | |
|---|---|---|---|---|
| 3,150,859 A | * | 9/1964 | Payne | B62D 55/32 254/228 |
| 3,379,005 A | * | 4/1968 | Jones | F16G 11/12 59/7 |
| 3,661,539 A | * | 5/1972 | Eastman | B62D 55/32 29/270 |
| 4,258,463 A | | 5/1981 | Lindquist | |
| 4,287,874 A | | 9/1981 | Michael | |
| 4,429,525 A | * | 2/1984 | Doak | B21L 21/00 59/7 |
| 5,878,472 A | | 5/1999 | Azeem | |
| 5,996,736 A | * | 12/1999 | Stankiewicz | B60R 9/0485 182/127 |
| 6,032,455 A | * | 3/2000 | Reimann | B21J 15/42 59/11 |
| 6,654,994 B2 | * | 12/2003 | LaFevers | B66C 1/62 29/252 |
| 6,662,421 B1 | * | 12/2003 | Krippelz, Sr. | B62D 55/32 29/559 |

(Continued)

*Primary Examiner* — Jacob J Cigna
*Assistant Examiner* — Michael W Hotchkiss
(74) *Attorney, Agent, or Firm* — Dale Jensen, PLC; Dale Jensen

(57) ABSTRACT

The present disclosure provides a system and multicomponent apparatus for removing and installing a continuous track on a power machine or work vehicle. The system includes a support and biasing apparatus, an arcuate positioning component, a decoupling component, and interconnecting elements. The interacting apparatus and components include contact surfaces that bear against the continuous track surfaces to transfer and/or apply a series of forces, each force in the series comprising at least one of an upward, forward, or lateral force, or combinations thereof, to remove the track from or urge and install a replacement track into proper alignment and captive engagement with front idler and sprocket wheels of a continuous track vehicle wheel assembly. Removal and installation of continuous tracks is hereby achieved in a fraction of the time and with substantially less manpower than previously proposed solutions and methods.

5 Claims, 13 Drawing Sheets

(56) References Cited

U.S. PATENT DOCUMENTS

| | | | |
|---|---|---|---|
| 6,733,093 B2 | 5/2004 | Deland et al. | |
| 6,922,881 B2 | 8/2005 | LaFevers | |
| 7,174,614 B2 * | 2/2007 | Martz | B25B 25/00 |
| | | | 29/257 |
| 7,310,864 B1 * | 12/2007 | Gingerich | B25B 27/22 |
| | | | 29/256 |
| 7,634,899 B2 * | 12/2009 | Otter | B21L 21/00 |
| | | | 254/100 |
| 9,975,591 B2 * | 5/2018 | Bair | B62D 55/32 |
| 2003/0160507 A1 | 8/2003 | Johnson et al. | |
| 2005/0262680 A1 * | 12/2005 | Martz | B62D 55/32 |
| | | | 29/257 |
| 2009/0183489 A1 * | 7/2009 | Otter | B21L 21/00 |
| | | | 59/7 |
| 2011/0277297 A1 * | 11/2011 | Rich | B25B 27/22 |
| | | | 29/428 |
| 2012/0042491 A1 * | 2/2012 | Ramsey | E02F 9/02 |
| | | | 29/283 |
| 2013/0239405 A1 * | 9/2013 | Griffith | B23P 6/00 |
| | | | 29/700 |
| 2015/0375816 A1 * | 12/2015 | Ramaiyan | B62D 55/32 |
| | | | 29/283 |
| 2019/0031258 A1 * | 1/2019 | Soik | B62D 55/32 |
| 2019/0359271 A1 * | 11/2019 | Quirk | B62D 55/32 |

* cited by examiner

SYSTEM AND MULTICOMPONENT APPARATUS FOR REMOVING AND INSTALLING A CONTINUOUS TRACK ON A TRACKED VEHICLE

CROSS-REFERENCE TO RELATED PATENT APPLICATIONS

NONE

STATEMENT REGARDING FEDERALLY SPONSORED RESEARCH OR DEVELOPMENT

NONE

BACKGROUND OF THE INVENTION

Field of Invention

The present disclosure generally relates to track replacement equipment for continuous track vehicles. More particularly, the present invention is a system and apparatus for removing and installing a continuous track onto a wheel or sprocket assembly of a continuous track vehicle.

Description of Related Art

Continuous tracks are used in many types of power machines and work vehicles including earth moving, construction, agricultural, forestry and mining equipment, and military and law enforcement vehicles. Power machines generally include any type of machinery that generates power to accomplish a particular task or variety of tasks. Continuous tracks are part of a power machine's propulsion system. One type of power machine is a work vehicle. Work vehicles are generally self-propelled vehicles that have a work element such as a lift arm or other work element that can be manipulated to perform a work function. Work vehicles include excavators, loaders, crawlers, tractors, and other tracked heavy equipment machines, to name a few examples.

Continuous rubber tracks are used to propel work vehicles and power machines. Continuous rubber tracks have several advantages over other forms of propulsion and are desirable as a mode of conveyance. One of the known advantages is in distributing the weight of the load a vehicle may carry. They are wide enough that the weight is distributed across the machine, preventing it from sinking in soft terrain. This facilitates travel when the ground is wet and reduces soil compaction. Another advantage is the greater traction allowed by having a greater surface contact area with the traveled surface, which is useful for pulling implements and heavy loads. Tracks allow the vehicles to have superior ground-holding capability and mobility over rough terrain. However, because the machines are often large in size and weight, the continuous tracks must be correspondingly high in strength and durability, which often makes working with the tracks unwieldy.

Many work vehicles, such as loaders and excavators, have tracks mounted on either side of a machine frame. Continuous or "endless" tracks are powered about track frames on which the tracks are carried. Each track is entrained about a drive sprocket, an idler roller, and a series of track rollers. One or more tensioning devices, such as tensioning cylinders, are employed with the idler to maintain a desirable tension on the continuous tracks. Typically, the idler roller is adjustable to thereby alter the tension in the track to enable the track to function in a desired manner. Typically, the tensioning mechanism is used to change, e.g. extend or retract, the position of the idler roller to create the needed tension in the track such that the track is retained on the set of rollers. Associated with each track is the drive sprocket that is powered by way of a gearing system that is driven by an engine. The drive sprocket wheel engages each continuous track to power the track and move the work vehicle over a surface. Idler rollers are non-powered wheel assemblies which are independent of the axle, they are not fixed but instead roll freely with the work vehicle's travel. The idler is placed at the end of a tracked wheel assembly to tension the track for preventing a loose track from slipping off its wheels. Because continuous tracks have no beginning or end, installation is often difficult and cumbersome given the need for positioning and alignment with respect to the vehicle wheel hubs. Wear in the track or stretching of the track creates slack in the track which needs to be removed for proper use. This is accomplished by adjusting the tensioning mechanism. Furthermore, because continuous tracks generally are not inherently stretchable over the machine idlers, the track must be held taut and in a configuration nearly identical to that of an installed track prior to installation.

The track is a continuous loop of rubber and/or metal and generally comprises a single section with a single travel surface-contacting component which includes tread lugs formed in track patterns for traction. For military purpose vehicles, the track may include outwardly facing travel surface-contacting plates or pads that can include treads for traction. The track inner surface includes inwardly facing drive lugs which cooperatively guide and engage mating lugs on the drive sprocket or roller. Tracks are typically formed with a plurality of holes and/or lugs or pegs formed therein that intermesh with the teeth of the sprocket wheel as the sprocket drives the track which thereby propels the vehicle. A set of rollers or "bogie wheels" are typically attached to the track frames and engage the endless tracks to distribute the weight of the machine over that portion of the track that is in engagement with the traveled surface. The drive lugs on the track are typically in the form of recesses or inward projections on the inner surface of the track that may cooperatively receive, or are received in, mating lugs on the drive sprocket or wheel. These lugs on the track also engage or partially encircle a groove or raised element on the idler for holding the track in alignment with the drive sprocket or wheel, the idler, and any bogies or other wheels of the vehicle or machine.

On work vehicles, the continuous tracks at times require removal and replacement. One consideration is the weight of the continuous track. Flexible rubber tracks are large and heavy. Due to the weight of a typical track, often hundreds of pounds, and the tension placed on the track by the idlers and corresponding tensioning devices, track removal and installation can be a challenging, labor intensive, and often dangerous task.

Often, rubber tracks are constructed with closely spaced steel reinforcing cables running parallel to the circumference. Rubber cogs are cast into the inside circumference to keep the continuous track captive and centered on its sprocket support and drive idlers. These added components increase the weight of the already heavy and unwieldy continuous tracks and render such tracks particularly difficult to handle. Indeed, because continuous tracks are so heavy, they can be damaged by their own weight if handled improperly. Consequently, such tracks are inherently cumbersome to manipulate and dangerous to work with. Unlike rigid components that can easily be lifted and placed with standard work equipment such as hoists, flexible tracks may assume many different undesirable shapes as different forces are applied. To lift the track and maintain the desired shape of the track is difficult and requires considerable manpower and time. Indeed, using presently available tools and methods, considerable physical labor and strain is required to position the track. Presently, much time and effort is lost in attempting to lever the track onto the idlers, increasing the risk of injury to the operators. Further, such methods do not control the sagging of the continuous track which binds and drags on every surface with which it comes in contact. Nonetheless, these limitation must be overcome when continuous tracks are installed on vehicles.

Yet another problem occurs when continuous tracks are removed from the vehicles idlers. In order to facilitate removal, vehicle idlers can be retracted and displaced somewhat using the tensioning devices in order to loosen the tension of the track to free the track cogs during removal of the track. However, the heavy weight of the track on the idlers often makes removal an arduous task. Additionally, this heavy weight makes the portions of the track surrounding the track holes resist disengagement and removal from the interacting sprocket teeth, further adding difficulty to the task of removing the track.

Thus, removing and installing a continuous track on a heavy-equipment machine generally requires a plurality of workers expending several hours each to remove an old continuous track and to maneuver the new continuous track onto a wheel or sprocket assembly of the machine. Such labor-intensive work is physically demanding and time consuming. Apart from the substantial labor expense involved with installing and removing continuous tracks, current methods for installing and removing continuous tracks may also lead to workplace injuries. Because of the weight of the components of the heavy equipment machines and tracks, and the brute forces required to be applied to the components by the workers, injury by accidents or overexertion is an occupational hazard of these tasks. Such risks compound the difficulty and hazards involved in installing and removing continuous tracks.

Because continuous tracks have no beginning or end, installation is often difficult, time-consuming, and cumbersome. Thus, the ability to install or reinstall a track in an expedient manner requiring as few personnel as possible, is advantageous, both from productivity and safety perspectives. Existing tools which are used in such an operation can be hazardous to unskilled operators, who are often injured when trying to lift or otherwise engage the heavy track onto the sprocket wheel of a track-type vehicle. In view of the foregoing disadvantages, there is a need for a method that overcomes the deficiencies in the prior art. What is needed in the art is a way of quickly and cost effectively replacing and installing, the track on a tracked vehicle that permits safe and fast replacement with a minimum of manpower.

The discussion above is merely provided for general background information and is not intended to be used as an aid in determining the scope of the claimed subject matter.

BRIEF SUMMARY OF THE INVENTION

The present disclosure is in general directed to a novel system, apparatus, and method for placing a continuous track onto a work vehicle. Embodiments of the disclosed invention as claimed include a track replacement system for removing and installing a continuous track on a wheel assembly of a tracked work machine or vehicle.

The disclosed system and multicomponent apparatus for installing a continuous track on a sprocket or wheel assembly broadly includes a track support and biasing apparatus including a first interconnector element; an arcuate positioning component including a second interconnector element; and a decoupling component including a third interconnector element.

In accordance with one aspect of the present disclosure, the system and multicomponent apparatus provides a track support and biasing apparatus, an arcuate positioning component, a decoupling component, interconnector elements, and further including contact surfaces configured to interact to transfer and/or apply force to the inner surface of the continuous track being removed or installed on a continuous work machine or vehicle.

In accordance with another aspect of the present disclosure, the novel system and multicomponent apparatus provides a track support and biasing apparatus including a first arcuate biasing member and a second arcuate member; the first arcuate biasing member is securely fixed to a first connector plate and the second arcuate member is securely fixed to a second connector plate; a locking assembly is mounted between the first connector plate and the second connector plate; and the first arcuate biasing member and the second arcuate biasing member are held parallel by the first connector plate and the second connector plate and the first and second connector plates are held substantially parallel by the locking assembly.

In accordance with yet another aspect of the present disclosure, the novel system and multicomponent apparatus provides a locking assembly that further includes an outer tubular member fixed to the first connector plate, the outer tubular member further including a laterally extending circular opening, an inner tubular member fixed to the second connector plate, the inner tubular member further including at least two laterally extending circular openings; and a mechanical locking fastener; the inner tubular member is slidingly received in length-adjustable, co-axial telescoping arrangement within the outer tubular member such that the outer tubular member circular opening registers in alignment with one of the inner tubular member circular openings; the locking mechanical fastener is removably received in the aligned openings to lock together the inner tubular member and the outer tubular member at distinct increment points of adjustment; and the first interconnector element is securely fixed to the outer tubular member.

In accordance with yet another aspect of the present disclosure, the novel system and multicomponent apparatus provides an arcuate positioning member that further includes a distal end arcuate plate member; an L-shaped bracket including a horizontally extending arm and a vertically extending arm; a longitudinally extending track engagement member; and the distal end arcuate plate member is securely fixed to the horizontally extending arm of the L-shaped bracket, the longitudinally extending track member is securely fixed to the vertically extending arm of the L-shaped bracket; and the second interconnector element is securely fixed to the longitudinally extending track engagement member.

In accordance with yet another aspect of the present disclosure, the novel system and multicomponent apparatus provides a decoupling component having a distal end formed including a generally L-shaped member; and the third interconnector element is securely fixed to the generally L-shaped member.

In accordance with still yet another aspect of the present disclosure, the novel system and multicomponent apparatus provides interacting surfaces including an outer surface of the arcuate biasing members contact surface for transferring and/or applying a force on an inner surface of a continuous track in an area corresponding to a location proximate to an idler in use conditions, the distal end arcuate plate member contact surface transfers and/or applies a force to the inner surface of the continuous track in an area corresponding to a location proximate to a sprocket wheel in use conditions, the decoupling component transfers and/or exerts a lifting force on the continuous track in an area corresponding to locations above and rearwardly of the sprocket wheel; and a series of forces are transferred and/or applied to the support and biasing apparatus, the arcuate positioning component and the decoupling component and the track, each force in the series comprising at least one of an upward, forward, or lateral force, or combinations thereof, to thereby remove the track from or urge and install the track in proper alignment and captive engagement on a continuous work machine or vehicle wheel assembly.

The systems and methods of the present disclosure have been developed in response to problems and needs associated with maintaining tracked vehicles that have not yet been fully resolved by currently available systems and methods. As will be readily appreciated from the foregoing, the present invention avoids the disadvantages of currently available systems and methods; thus, the systems and methods disclosed herein provide a solution to current challenges within the art. These and other features, aspects and advantages in accordance with the claimed invention will become better understood with reference to the following description, appended claims and accompanying drawings.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which ill be further described below, in addition to those here summarized.

BRIEF DESCRIPTION OF THE DRAWINGS

The above-mentioned and other features and advantages of the claimed invention, and the manner of attaining them, will become more apparent and the disclosure will be better understood by reference to the following descriptions of embodiments of the invention taken in conjunction with accompanying drawings, wherein:

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Embodiments of the claimed invention will be best understood by reference to the accompanying drawings, which are not necessarily to scale, and wherein like reference numbers indicate identical or functionally similar elements. For purposes of clarity, the spaces between the components are not to scale but enlarged to better illustrate the operation of the device. It will be readily understood that the components of the present invention, as generally described and illustrated in the figures herein, could be arranged and designed in a wide variety of different configurations. The claimed invention may be embodied in many different forms and should not be limited to the illustrated embodiments disclosed. Rather, these embodiments are provided so that this disclosure will be thorough and complete, and will fully convey the scope of the claimed invention to those skilled in the art. Thus, the following more detailed description, as represented in the figures, is not intended to limit the scope of the invention as claimed, but is merely representative of presently preferred embodiments of the invention.

FIGS. 1-16G illustrate schematically a system and apparatus for placing a continuous track on a work vehicle. In the arrangement described herein, the system and apparatus 10 includes a multipart apparatus 10A, 10B, and 10C having track removal and installation and positioning components. Continuous track removal and installation apparatus 10 may be used with any type of continuous track, including tracks suitable for use with construction and excavation vehicles. The apparatus is particularly useful for replacing tracks which are large, heavy, or difficult to remove or place on their sprocket wheel assemblies. Examples include but are not limited to, continuous tracks in skid steers, multi terrain and compact track loaders.

Figure 1:
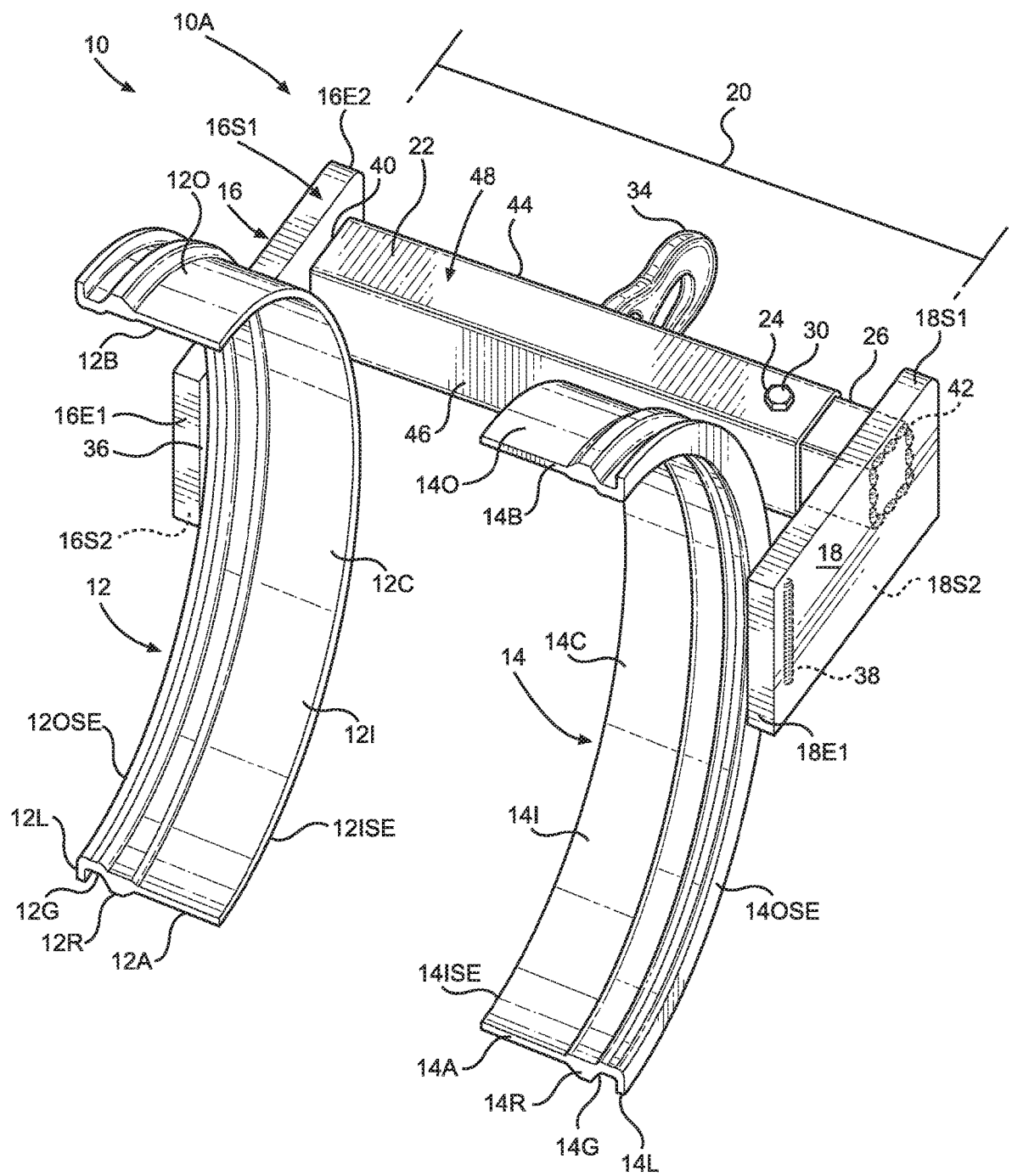
FIG. 1 is a distal side perspective view of a track support and biasing apparatus according to a representative embodiment of the continuous track replacement system of the disclosure.
Figure 2:
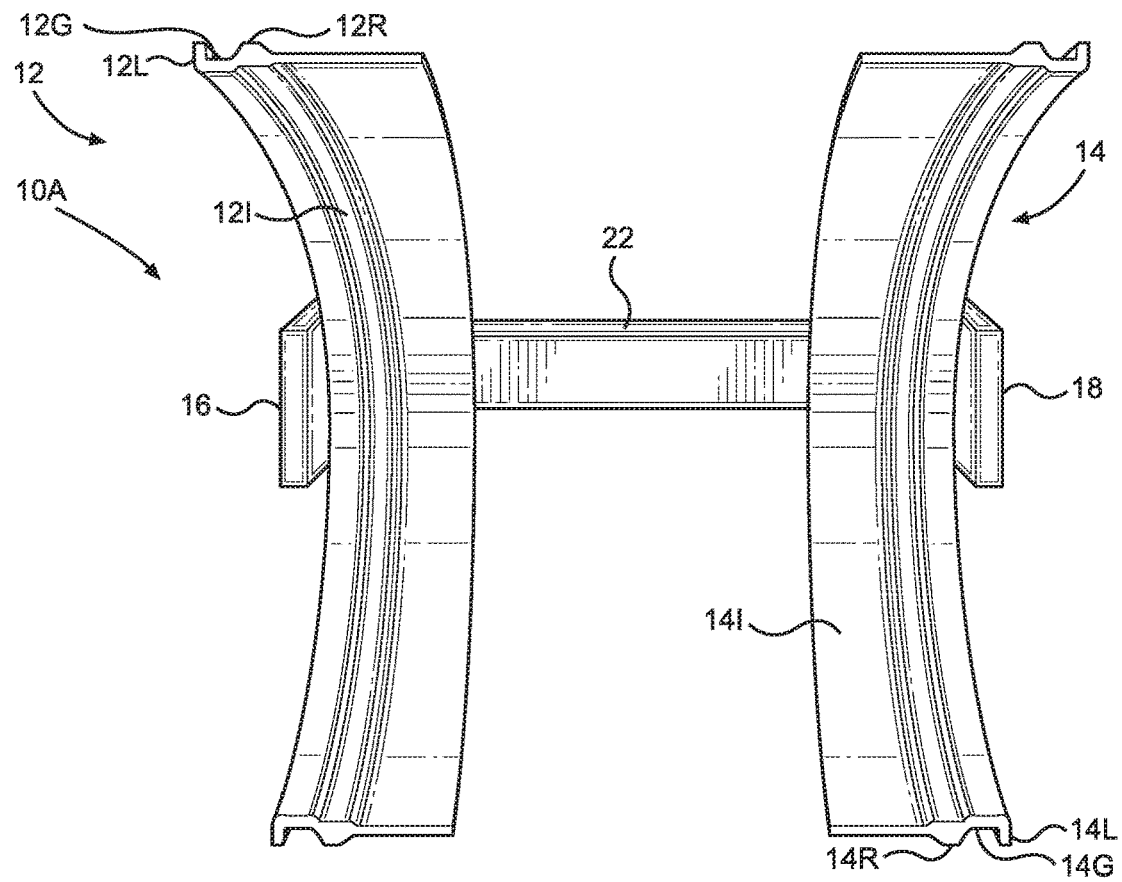
FIG. 2 is a rear perspective view of the apparatus of FIG. 1.
Figure 8:
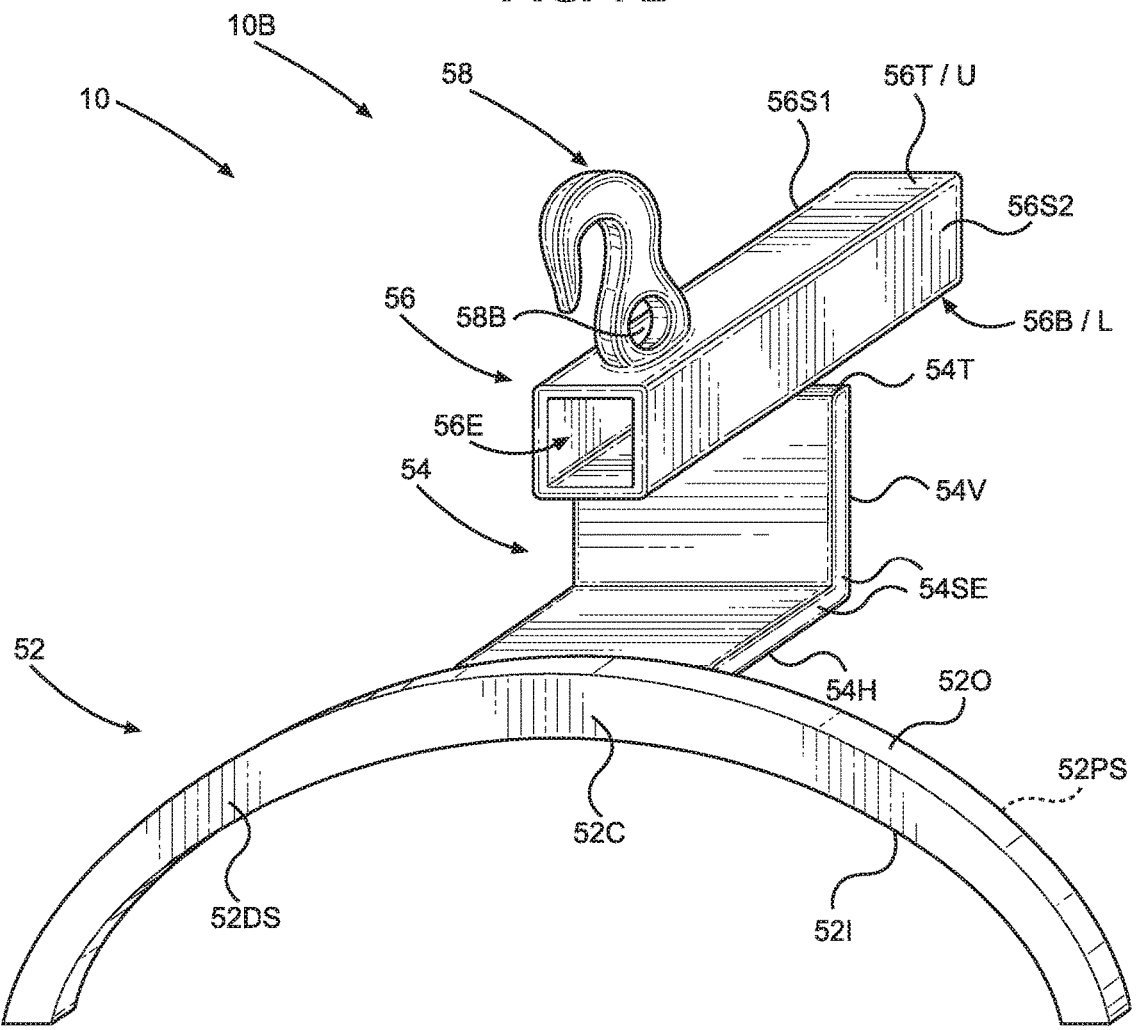
FIG. 8 is a distal side perspective view of an arcuate positioning component according to a representative embodiment of the continuous track replacement system of the disclosure.
Figure 9:
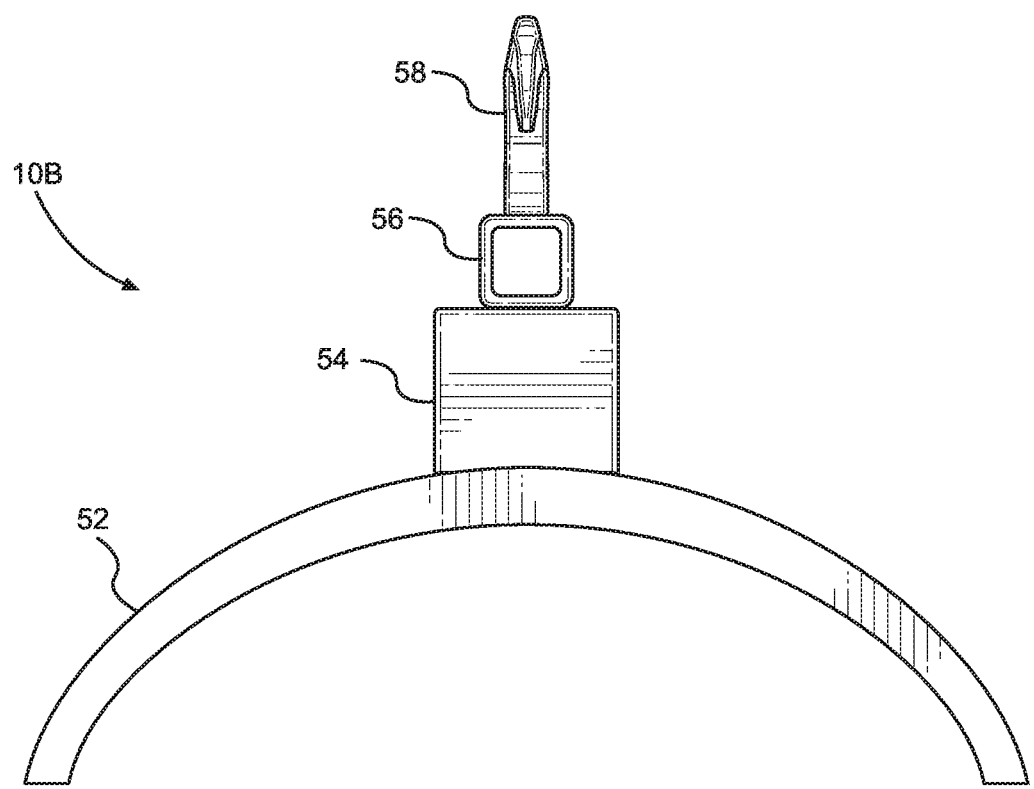
FIG. 9 is a distal plan view of the component of FIG. 8.
Figure 10:
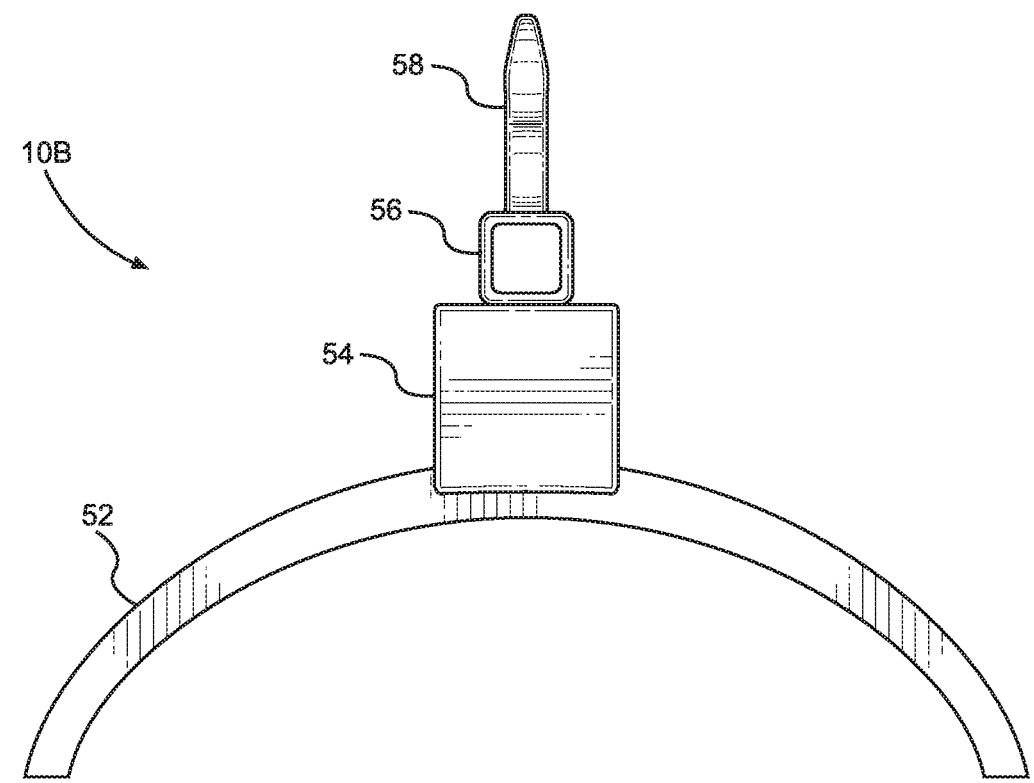
FIG. 10 is a proximal plan view of the component of FIG. 8.
Figure 15:
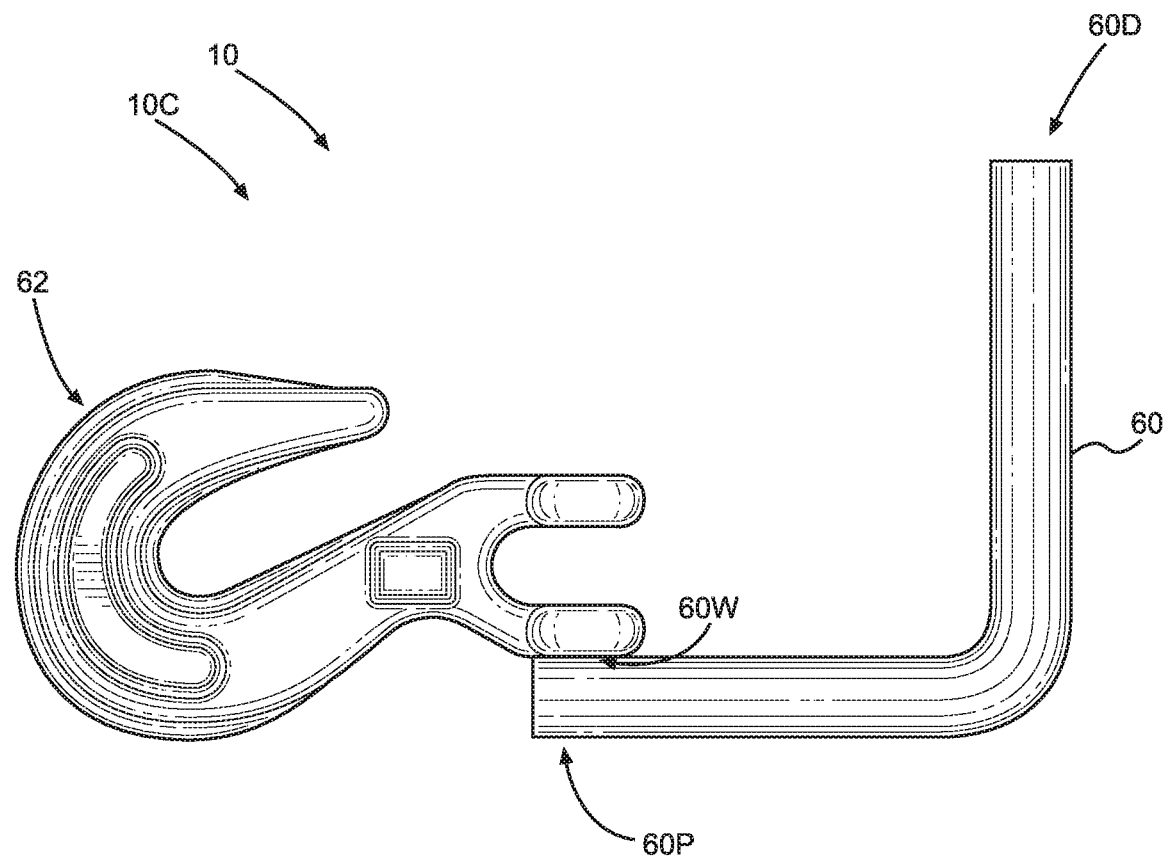
FIG. 15 is a side view of a decoupling component according to a representative embodiment of the continuous track replacement system of the disclosure.

Turning now to the Figures, as shown in FIGS. 1, 8 and 15, track placement apparatus 10 includes a support and biasing apparatus 10A, an arcuate positioning component 10B, and a decoupling component 10C.

The track support and biasing apparatus 10A includes first and second arcuate biasing members 12 and 14 generally parallel to each other and configured for bracketing, supporting and levering a continuous track to be placed. The first and second arcuate biasing members 12, 14 are securely attached to first and second connector plates 16 and 18, respectively. A locking assembly 20 extends between the first and second plates 16 and 18, as will be further described hereinafter. The biasing apparatus 10A also includes locking members 30, 32 and a first interconnector element 34.

As shown in FIGS. 8-14, arcuate positioning component 10B includes an arcuate plate end member 52 and a longitudinal track engagement member 56. A mounting bracket 54 extends between the arcuate plate end member 52 and the longitudinal track engagement member 56, as will be further described hereinafter. The arcuate positioning component also has a second interconnector element 58.

As shown in FIG. 15, decoupling component 10C includes generally an L-shaped bar 60 and a third interconnector element 62, as will be further described hereinafter.

Figure 3:
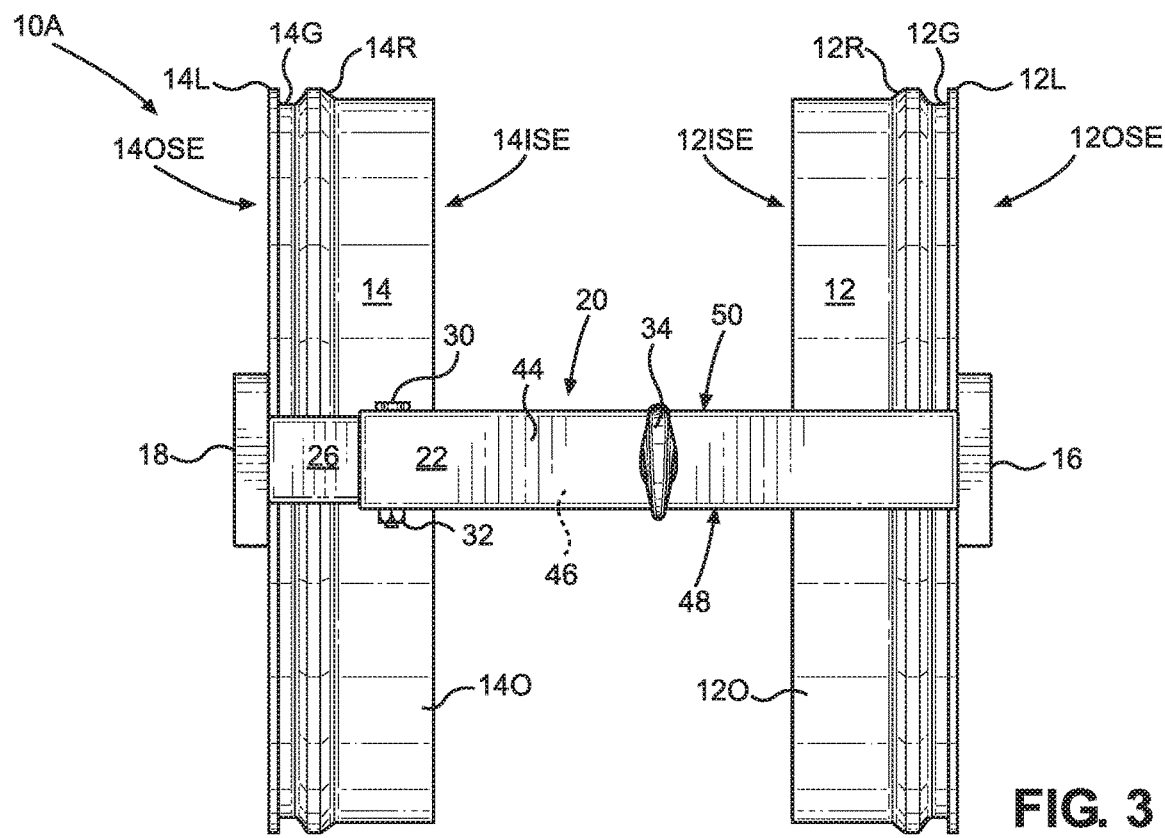
FIG. 3 is a front plan view of the apparatus of FIG. 1.
Figure 4:
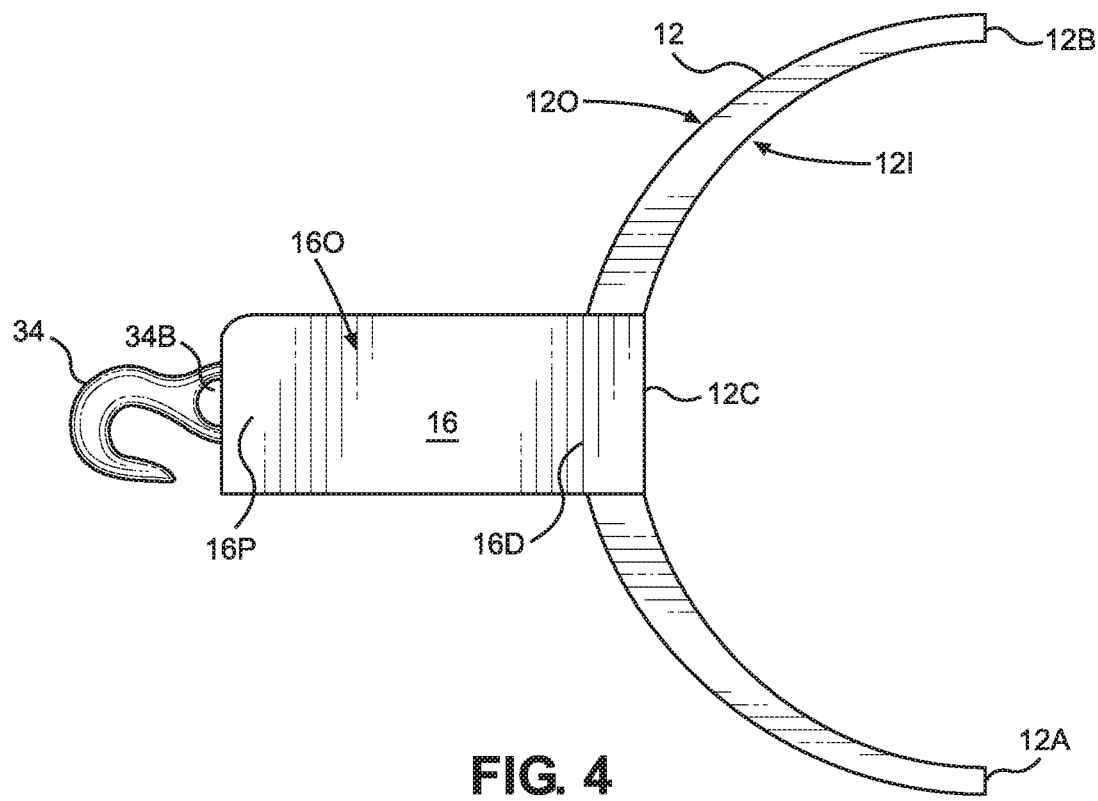
FIG. 4 is a side view of the apparatus of FIG. 1.
Figure 5:
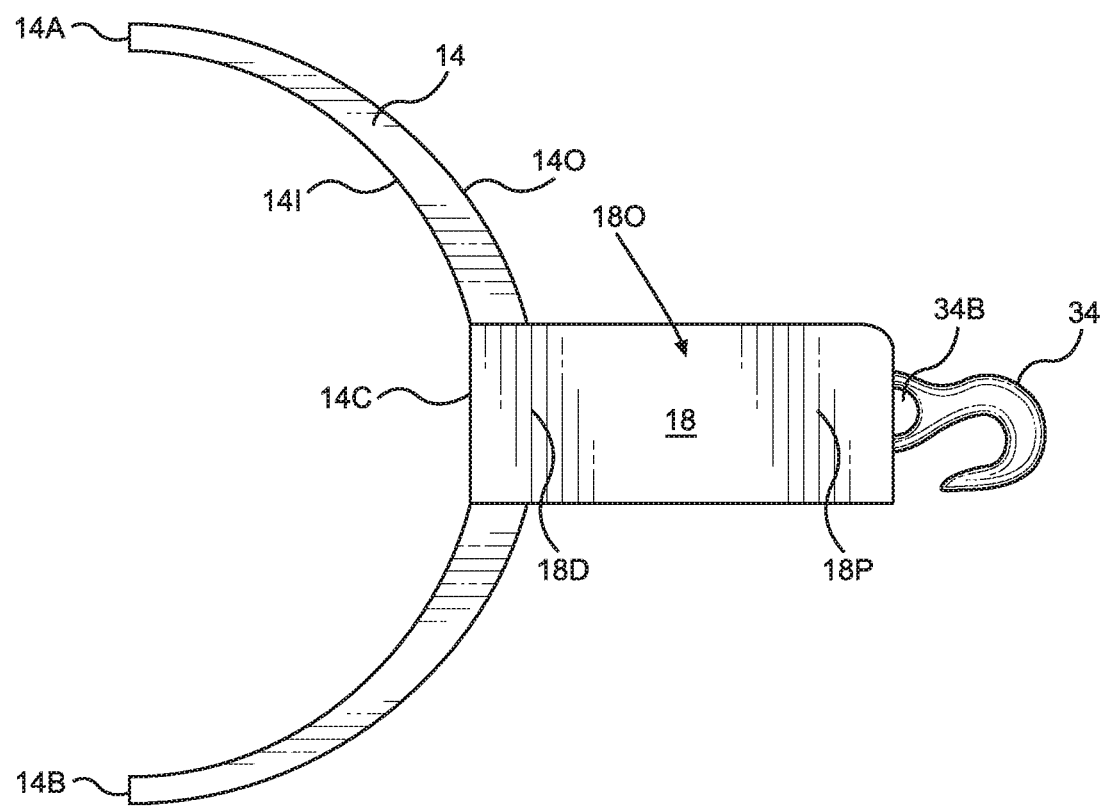
FIG. 5 is an opposite side view of the apparatus of FIG. 1.
Figure 6:
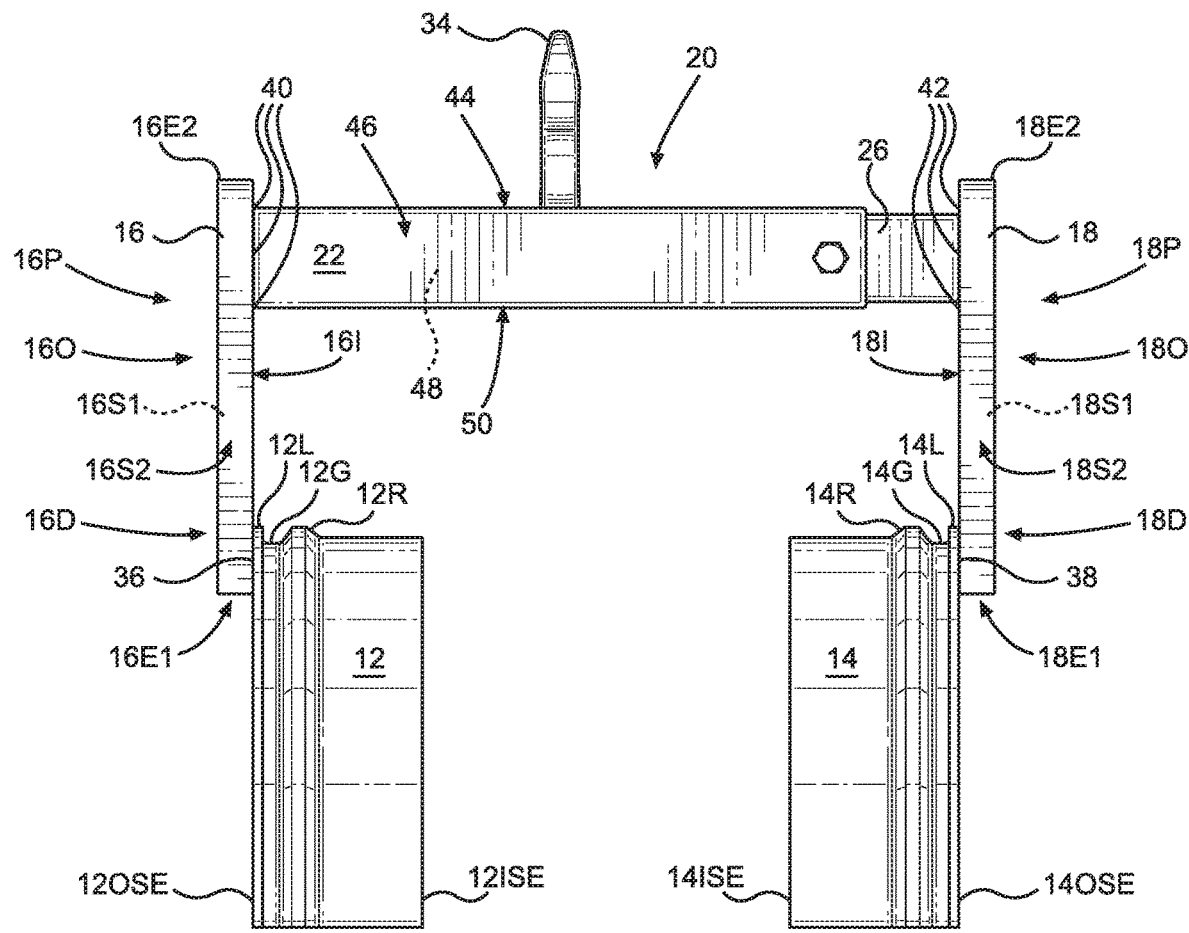
FIG. 6 is a top plan view of the apparatus of FIG. 1 shown in a retracted condition.

As shown in FIGS. 1, 3 and 6, the arcuate biasing members 12 and 14 are generally parallel to each other. Each of the first arcuate biasing member 12 and the second arcuate biasing member 14 has a generally curved or arc shape. The term "biasing member" is used in a functional sense to indicate a generally continuous set of points or contact surface area of an element that imparts a force on another element. The preferred embodiment employs an arcuate biasing member. Examples of other forms that are available for alternative embodiments include, but are not limited to, rigid rods, bars, planks, beams, plates, disks, rings, shoes, or plates having a semicircle shape, a semi-elliptical shape, a C shape or a D shape, or any other suitable structure having a distal end surface, edge or side including a flattened, tapered, or wedge-shaped surface formed such as for a working end contact area providing a bearing surface used as a lever or pry against a heavy or firmly fixed load when pressure or torque is applied or transferred to its opposite, proximal end; or any other suitable structures having the material strength and durability to resist the compressive forces of the weight and tension of a continuous track on the idlers. Those having ordinary skill in the art will understand that any suitable bearing surface member may be used in forming the arcuate biasing member disclosed herein. Those having ordinary skill in the art will recognize that a number of variations may be made in the disclosed embodiments, all without departing from the scope of the invention, which is defined solely by the appended claims. The term "arcuate" will be understood as including a series of straight segments in end to end, angularly spaced pattern, forming a generally arced or curved shape, as well as a smoothly curved shape.

Arcuate biasing member 12 is formed including endpoints 12A, 12B, centerpoint 12C, an inner surface 12I and an opposite outer surface 12O. Arcuate biasing member 14 is formed including endpoints 14A, 14B, centerpoint 14C, an inner surface 14I and an opposite outer surface 14O.

Arcuate biasing members 12, 14 are shaped in an arc for engaging an inside surface of a track. Outer surfaces 12O and 14O are track interfacing surfaces to seat and exert a bias or force against the inside surface of a track. Outer surfaces 12O and 14O thus form a generally continuous set of points which comprise a contact surface area which transfers and/or applies force to the inner surface of a continuous track. The contact surface area provided by outer surfaces 12O, 14O faces and is linearly spaced from the basal opening end 34B of the first interconnector element 34 and transfers and/or applies a force applied at a remote location, which may be the first interconnector element 34, to the contact surface area provided by outer surfaces 12O, 14O, to thereby transfer and/or apply that force to the inner surface of the continuous track.

The arcuate biasing members 12, 14 may have a radius of curvature which is larger than a radius of curvature of an idler roller or idler wheel or wheel over which the track will be installed such that during track installation operations the track can be more easily installed over the idler. Arcuate biasing members having larger or smaller radii may be provided as required for use with different size idlers, tracks or track types. By way of non-limiting example, a larger radius arcuate biasing member may be used with a larger radius idler or track; a smaller radius arcuate biasing member may be used with a smaller radius idler or track; or arcuate biasing members for different various types or widths of rubber and steel tracks, in order to provide a selected arcuate biasing member shape and size for installing a continuous track about an idler of any variety of tracked work vehicles according to the present disclosure.

As shown in FIGS. 1, 2, 3 and 6, the arcuate biasing members 12, 14 are generally parallel to each other. Inner side edge 12ISE and inner side edge 14ISE are horizontally spaced near each other and face each other in a mirror image configuration. Outer side edge 12OSE and outer side edge 14OSE face away from each other. Outer side edge 12OSE includes a co-terminus flange comprising terminal lip 12L, an annular groove 12G formed inboard of lip 12L, and raised rib or projection 12R inboard of annular groove 12G for engaging and supporting a portion of the continuous track and for carrying and fitting the track laterally into position over an idler roller or wheel. Outer side edge 12OSE and outer side edge 14OSE face away from each other. Outer side edge 14OSE includes a co-terminus flange comprising terminal lip 14L, an annular groove 14G formed inboard of lip 14L, and raised rib or projection 14R inboard of annular groove 14G for engaging and supporting a portion of the continuous track and for carrying and fitting the track laterally into position over an idler roller, wheel, or sprocket. The track interfacing arcuate biasing members may be made of steel, iron, aluminum, stainless steel, metal alloy, or other metal suitable for heavy duty applications or tool making.

The arcuate biasing members 12, 14 are held generally parallel by connector plates 16, 18. The first arcuate biasing member 12 is securely attached to first connector plate 16 and the second arcuate biasing member 14 is securely attached to the second connector plate 18. In a preferred embodiment the plates are mirror images of each other. In alternative embodiments, asymmetrical or symmetrical connector shapes may be employed for various shapes and sizes of arcuate biasing members for use with idlers of dissimilar diameter, different tracks, or track types. Connector plates 16, 18 are held in opposing parallel relation by a locking assembly 20 and are spaced a distance apart corresponding to a width of the track to be removed or installed. Although embodiments of the locking assembly as described herein may be provided as a non-adjustable telescopically sliding separable assembly in various widths or for opening, separating, positioning and closing about a track of a particular width, in other embodiments the assembly may take on other mechanical forms. By way of non-limiting example, a telescopically slideable adjustable locking assembly may be adapted for use with different width tracks to allow the track remover to be quickly and easily positioned about a track to be removed without the use of tools, and other modifications are contemplated while remaining within the scope of the present disclosure or appended claims, as will be appreciated by those skilled in the art along with other benefits and advantages of the present disclosure.

Connector plate 16 as shown is a solid, planar generally rectangular element, having two oppositely disposed side edges 16S1, 16S2, two oppositely disposed end edges 16E1, 16E2, an inner surface 16I, an outer surface 16O, a proximal end 16P and a distal end 16D. Arcuate biasing member 12 outer side edge 12OSE at centerpoint 12C is securely fixed to connector plate 16 distal end 16D inner surface at attachment point 36 by means including, but not limited to, welding, riveting, screwing, mechanical fastening, or forming in one-piece construction as a unitary body without departing from the scope of the disclosed invention as claimed.

Connector plate 18 as shown is a solid, planar, generally rectangular element, having two oppositely disposed side edges 18S1, 18S2, two oppositely disposed end edges 18E1, 18E2, an inner surface 18I, an outer surface 18O, a proximal end 18P and a distal end 18D. Arcuate biasing member 14 outer side edge 14OSE at centerpoint 14C is securely fixed to connector plate 18 distal end 18D inner surface at attachment point 38 by means including, but not limited to, welding, riveting, screwing, mechanical fastening, or forming in one-piece construction as a unitary body without departing from the scope of the disclosed invention as claimed.

As shown in FIGS. 1, 6, 7A and 7B, a locking assembly 20 is mounted on connector plates 16, 18. The connector plates 16, 18 are securely fixed to the locking assembly 20 and are arranged and held in a substantially parallel configuration by the locking assembly 20 members 22, 26 respectively, as will be further described hereinafter. Locking assembly 20 includes an inner tubular member 26 slidingly received in co-axial telescoping arrangement within an outer tubular member 22. Outer tubular member 22 and inner tubular member 26 are rejoinably separable thereby allowing the connector plates 16, 18 to be separated from each other for positioning and placement of arcuate biasing members 12, 14 outer surfaces 12O, 14O respectively, against an inner surface of a continuous track, then rejoined, and locked thereagainst.

Locking assembly 20 includes an outer tubular member 22 made from steel, iron, aluminum, stainless steel, or other metal or metal alloy or composite suitable for heavy duty operations. The outer tubular member 22 is preferably a hollow square tube, however, it could be of another geometrical configuration including, but not limited to, a hollow round tube, a hollow rectangular tube or the tube could be a solid member, if desired. It is understood that other polygonal shapes are contemplated while remaining within the scope of the present disclosure or appended claims, as will be appreciated by those skilled in the art, along with other benefits and advantages of the claimed invention. As best depicted in FIGS. 1, 3, 6, 7A and 7B, the outer tubular member 22 includes an inner end configured to slidingly receive an inner end of the inner tubular member in co-axial telescoping arrangement, and an oppositely disposed outer end; proximal and distal sides 44, 46 respectively; and oppositely disposed apertured sides 48, 50. As best depicted in FIGS. 1, 6, 7A and 7B, one end, which is the outer end of the outer tubular member 22, is securely fixed to the inner surface 16I of the proximal end 16P of connector plate 16 at an attachment point 40, which may be a plurality of attachment points, by means including, but not limited to, welding, riveting, brazing, or mechanical fastening. As shown in FIGS. 1, 6, 7A and 7B, the outer tubular member 22 includes a circular opening 24 extending laterally therethrough.

Locking assembly 20 further includes inner tubular member 26 made from steel, iron, aluminum, stainless steel, or other metal or metal alloy or composite suitable for heavy duty operations suitable for heavy duty operations. As best depicted in FIGS. 1, 3, 7A and 7B, the inner tubular member 26 includes an inner end and an oppositely disposed outer end. The inner end is configured to be slidingly received within an inner end of the outer tubular member in co-axial telescoping arrangement. The inner tubular member 26 is preferably a hollow square tube which is dimensioned such that it may be slidingly received within the outer tubular member 22. Tubes having other geometrical configurations including, but not limited to, hollow round tubes, hollow rectangular tubes, or solid member tubes are also contemplated while remaining within the scope of the present disclosure or appended claims, as will be appreciated by those skilled in the art, along with other benefits and advantages of the present claims. In embodiments in which the outer tubular member 22 is not square, then the inner tubular member 26 would be provided with the same geometrical configuration as the outer tubular member 22. As best depicted in FIGS. 1, 3, 6, 7A and 7B, one end, which is an outer end of the inner tubular member 26 is securely fixed to the inner surface 18I of the proximal end 18P of connector plate 18 at an attachment point 42, which may be a plurality of attachment points, by means including, but not limited to, welding, riveting, brazing, or mechanical fastening.

Figure 7A:
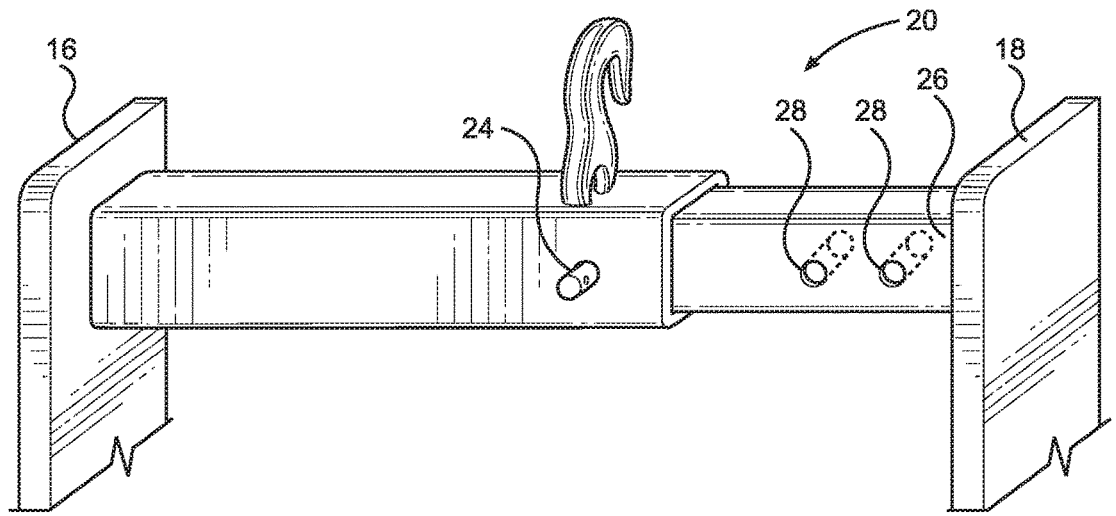
FIG. 7A is a detail section view of the apparatus of FIG. 1 shown in an extended condition.
Figure 7B:
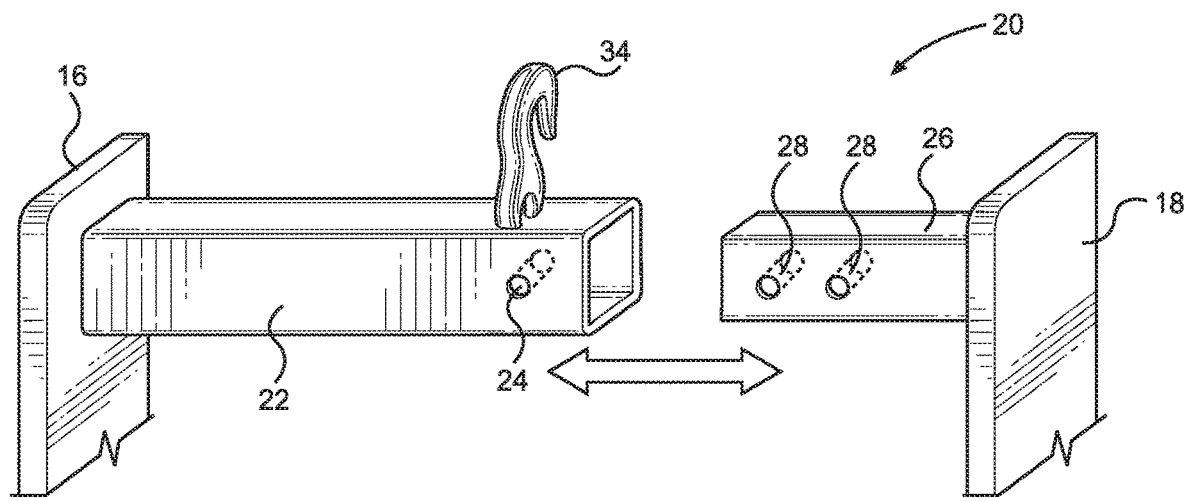
FIG. 7B is a detail section view of the apparatus of FIG. 1 shown in a separated condition.

As seen in FIGS. 7A and 7B, the inner tubular member 26 includes oppositely disposed proximal and distal sides having at least two circular openings 28, 28 horizontally spaced along a longitudinal axis of the member and extending laterally therethrough, thereby allowing locking assembly 20 tubular members 22, 26 to be adjustable along a length dimension for use with various width dimensions and/or types of rubber and/or metal tracks and/or idlers having various dimensions of arc radii. In less preferred embodiments, it is contemplated that the locking assembly may be provided in various discrete sizes for use with, and thereby allowing separating, placing and locking of arcuate biasing members 12, 14 about, various width dimensions of tracks without departing from the scope of the disclosed invention as claimed.

The locking assembly 20 is extendable and retractable in a longitudinal direction of the telescoping tubular members 22, 26 by sliding thereof along a linear axis such that opening 24 registers in alignment with one of the openings 28 at a desired length. A corresponding locking mechanical fastener 30 is removably received in the aligned openings 24, 28 to lock the concentric telescoping tubular members 22, 26 together at distinct increment points of adjustment. In preferred embodiments the locking mechanical fastener is a hex bolt 30 and corresponding hex nut lock nut 32 which secures bolt 30 thereby locking the members 22 and 26 in position about an idler roller. In alternative embodiments, the locking member and lock nut or lock washer may be a mechanical fastener including but not limited to, any suitable lockable screw or bolt that can fit though the aligned pairs of circular openings simultaneously, or threaded openings and screw shank for use therewith, pin, rod, or other available locking fasteners having the material properties of strength and durability that would be suitable for alternative embodiments of the claimed invention.

The locking assembly 20 includes a first interconnector element 34 which is mounted to proximal surface of outer tubular member 22 for temporary linking with a chain, link, sling, rigging, boom, or other desired connector, thereby providing a connection between a load and lifting gear, force-applying, and/or force-transferring elements for lifting, suspending, moving, hoisting, lowering, and/or applying or transferring a force to, the corresponding load. In a preferred embodiment, the interconnector element includes a hook for manually connecting and disconnecting the interconnector elements thereby allowing faster and easier coupling and uncoupling of the apparatus and components from a continuous track during track removing, placing, and installing operations.

Although the preferred embodiment depicted in FIGS. 1-16G includes a hook, those of skill in the art will understand the term "interconnector element" is used in a functional sense indicating a generally hook-shaped structural member. Examples of other forms include, but are not limited to, hooks, eyebolts with associated nuts and screw holes, ring bolts, hoist rings, swivel hoist rings, swivel links, lifting points, pigtail eyebolts, eye nuts, hitches, shackles, devises, end connectors, bands, chains, cables, straps, or any suitable mechanical linking connector providing secure, temporary coupling and uncoupling. The first interconnector element 34 includes an enlarged basal hole 34B for providing a second attachment point for adjusting the effective length of a chain received in the first interconnector element 34 or for a receiving a chain link, clevis, shackle, linking assembly, rope, or other flexible connector.

Figure 11:
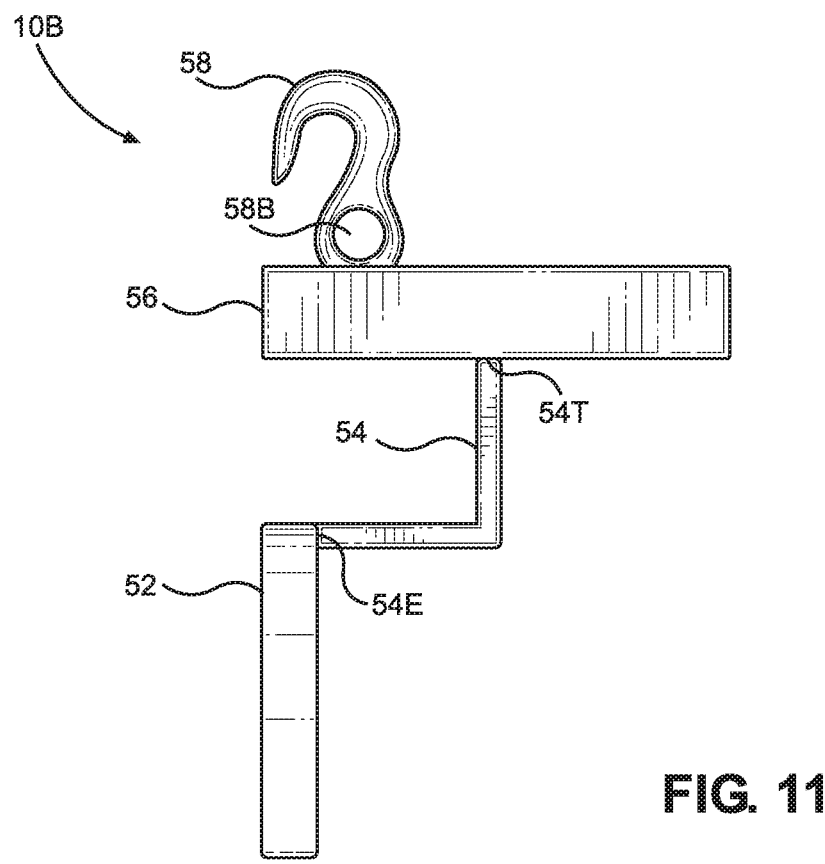
FIG. 11 is a side view of the component of FIG. 8.
Figure 12:
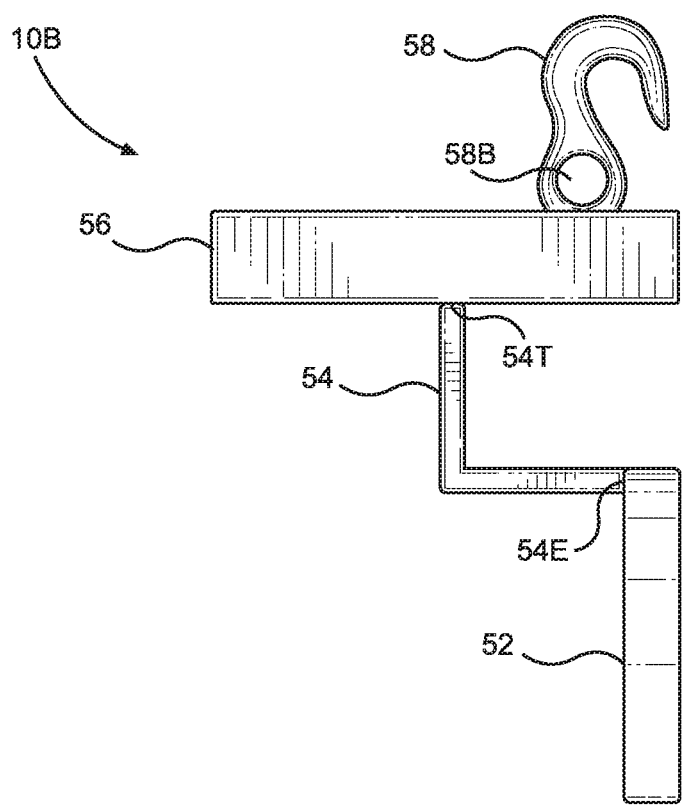
FIG. 12 is an opposite side view of the component of FIG. 8.
Figure 13:
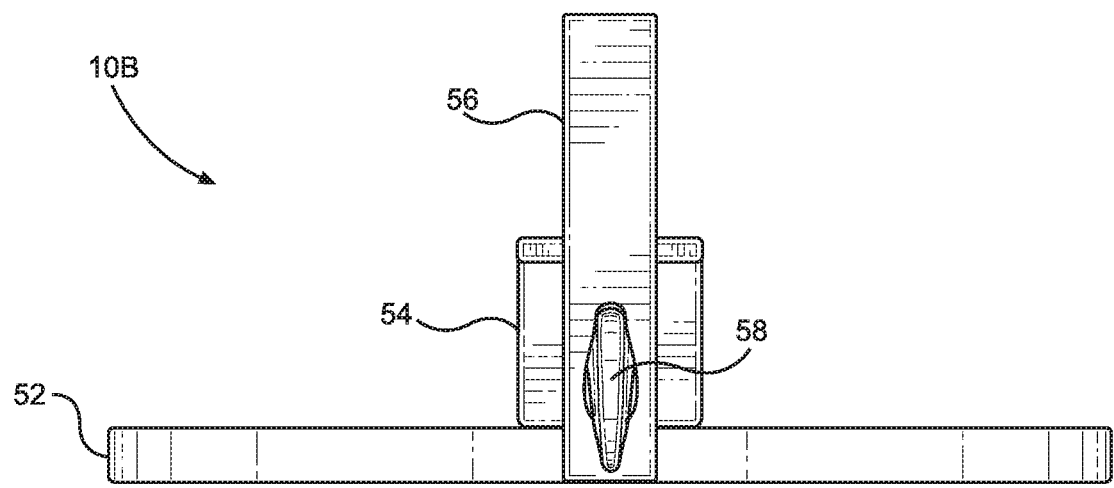
FIG. 13 is a top plan view of the component of FIG. 8.
Figure 14:
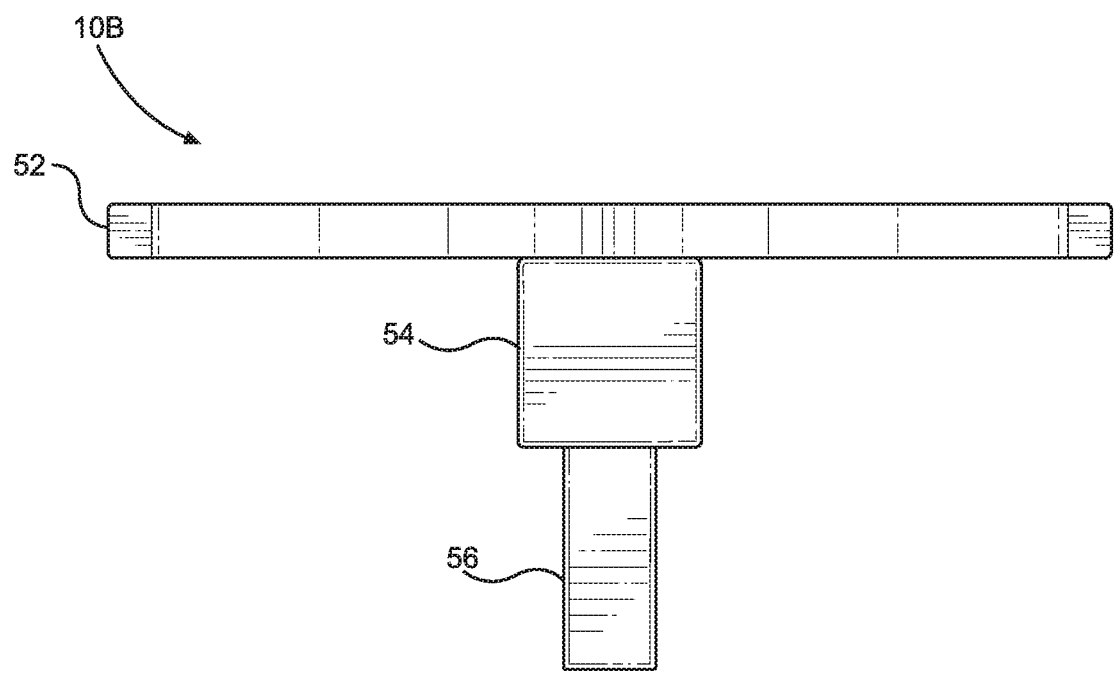
FIG. 14 is a bottom plan view of the component of FIG. 8.

Turning now to FIGS. 8-14, the track replacement apparatus 10 includes an arcuate positioning component 10B. The arcuate positioning component 10B includes a distal end arcuate plate member 52 having an endpoint 52A, an endpoint 52B, a centerpoint 52C, an inner surface 52I, an oppositely disposed outer surface 52O, and two oppositely disposed side faces which are a distalmost side face 52DS and a proximal side face 52PS. As shown in FIGS. 8, 11 and 12, an L-shaped mounting bracket 54 is configured to be attached to both the distal end arcuate plate member 52 and a longitudinally extending longitudinal track engagement member 56. The L-shaped mounting bracket 54 includes a horizontally extending arm 54H and a vertically extending arm 54V. The horizontally extending arm 54H end edge is securely affixed by welding or other suitable means of securement to the arcuate plate member 52 proximal side face 52PS at center point 52C. The longitudinal track engagement member 56 is a longitudinally extending hollow square tube having a lower, bottom surface and an upper, top surface. The lower, bottom surface is affixed by welding or other suitable method of attachment to the vertically extending arm 54V end edge is securely affixed by weld or other suitable means of attachment to the longitudinally extending longitudinal track engagement member 56.

Figure 16A:
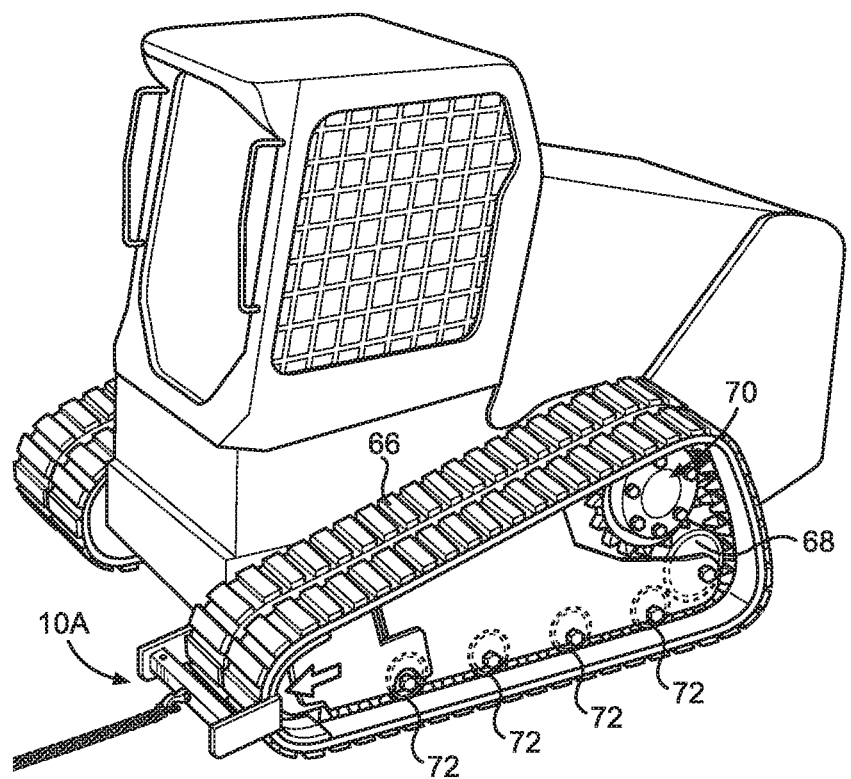
FIG. 16A-G illustrate various views of a preferred embodiment of the present disclosed invention used to remove and install continuous tracks on a tracked vehicle.
Figure 16B:
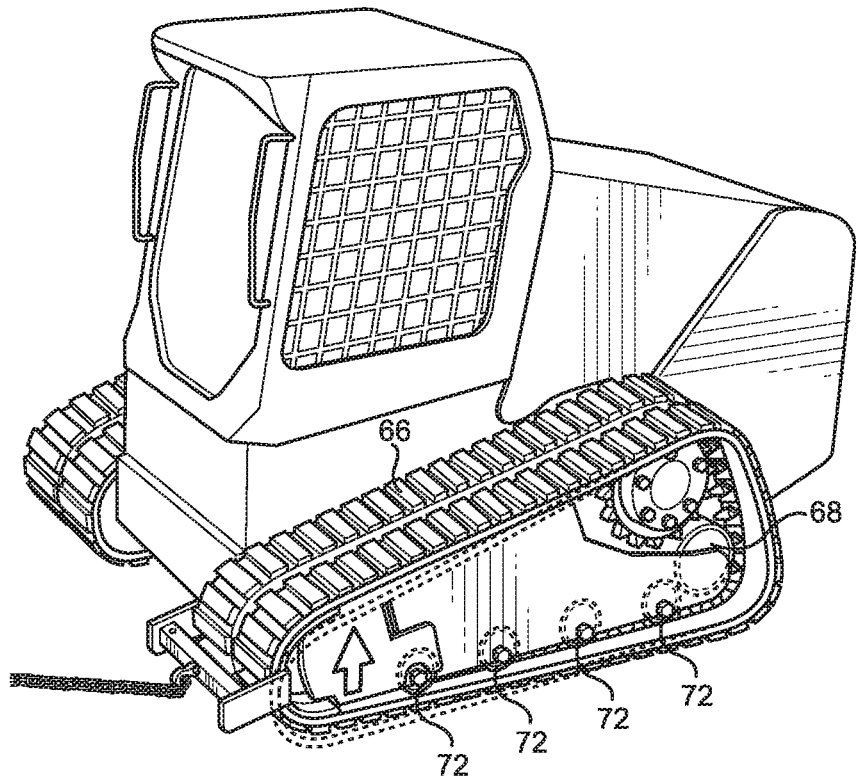
Figure 16C:
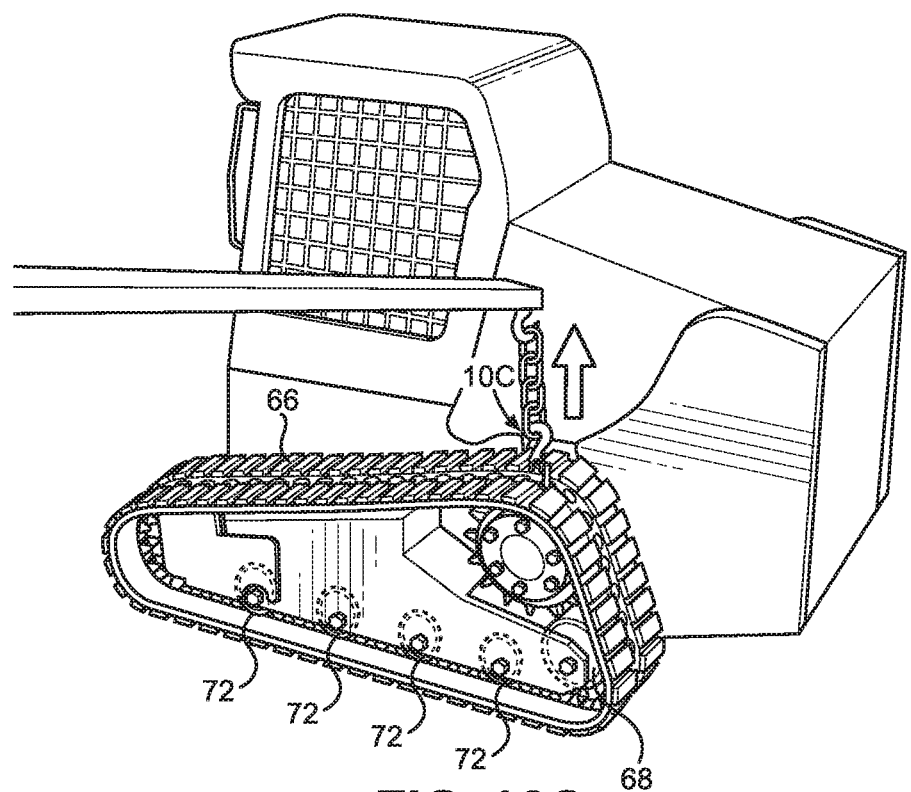
Figure 16D:
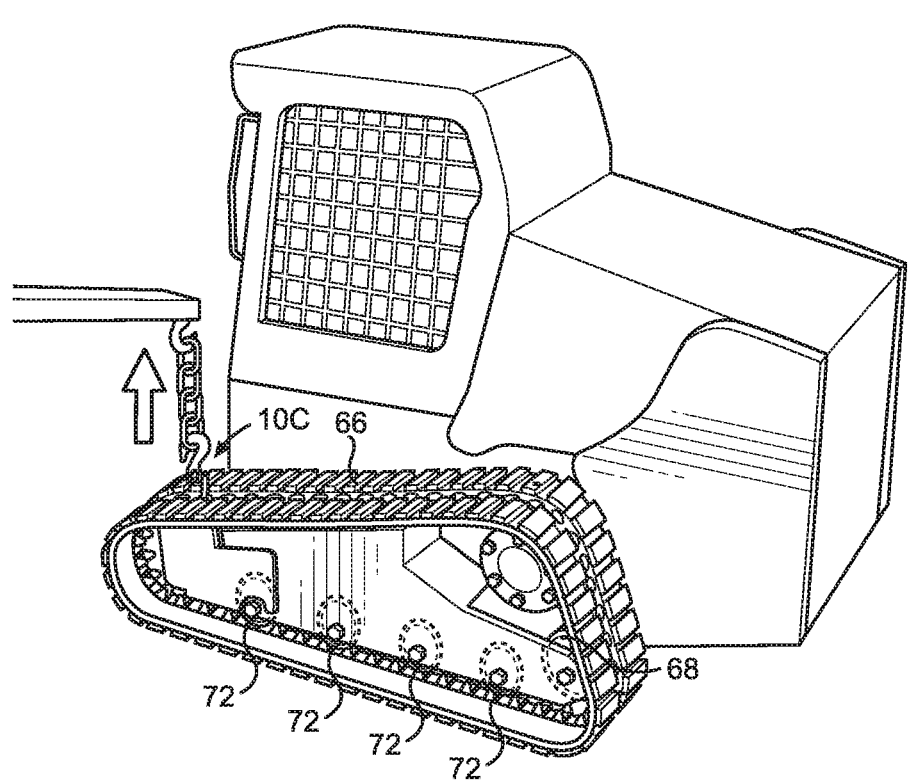
Figure 16E:
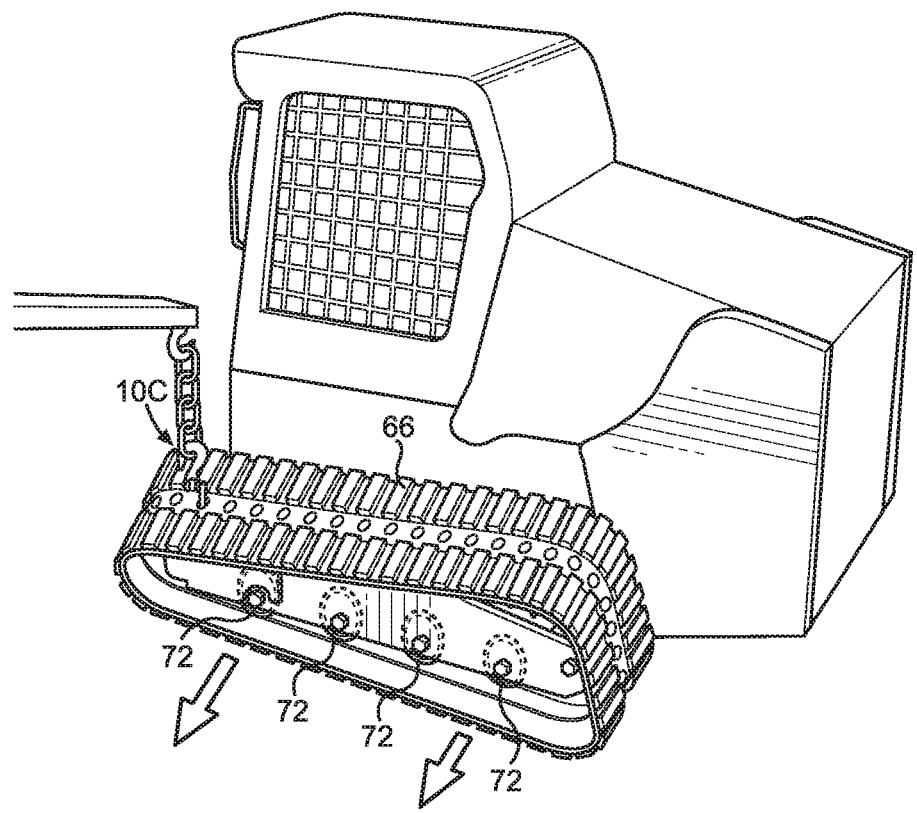
Figure 16F:
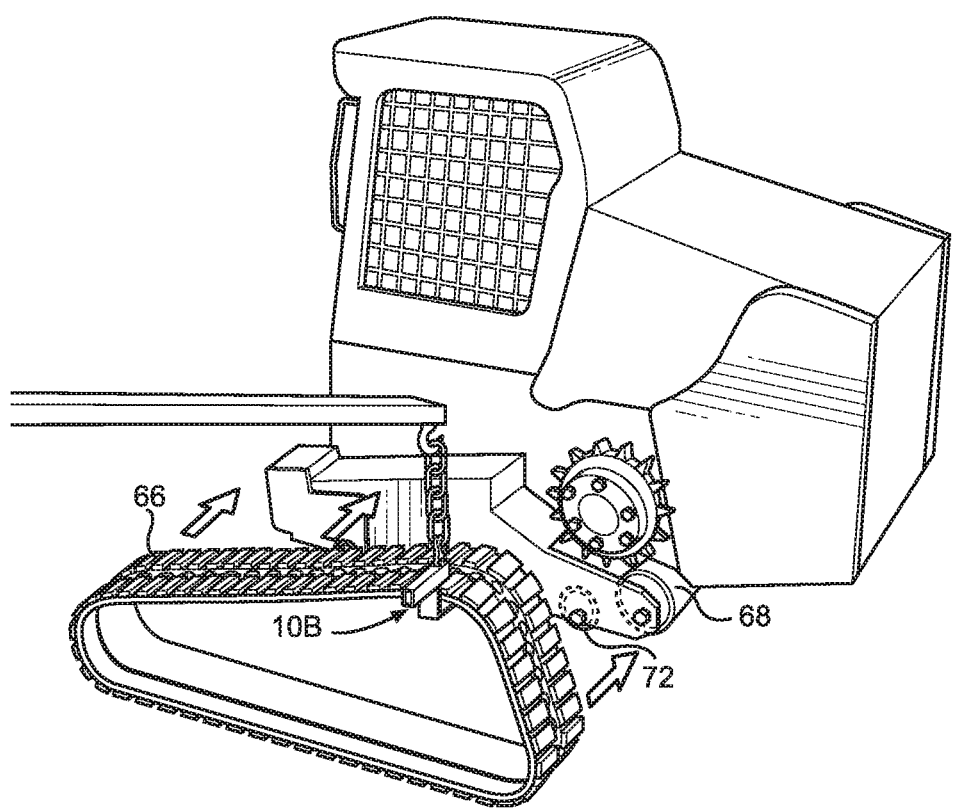
Figure 16G:
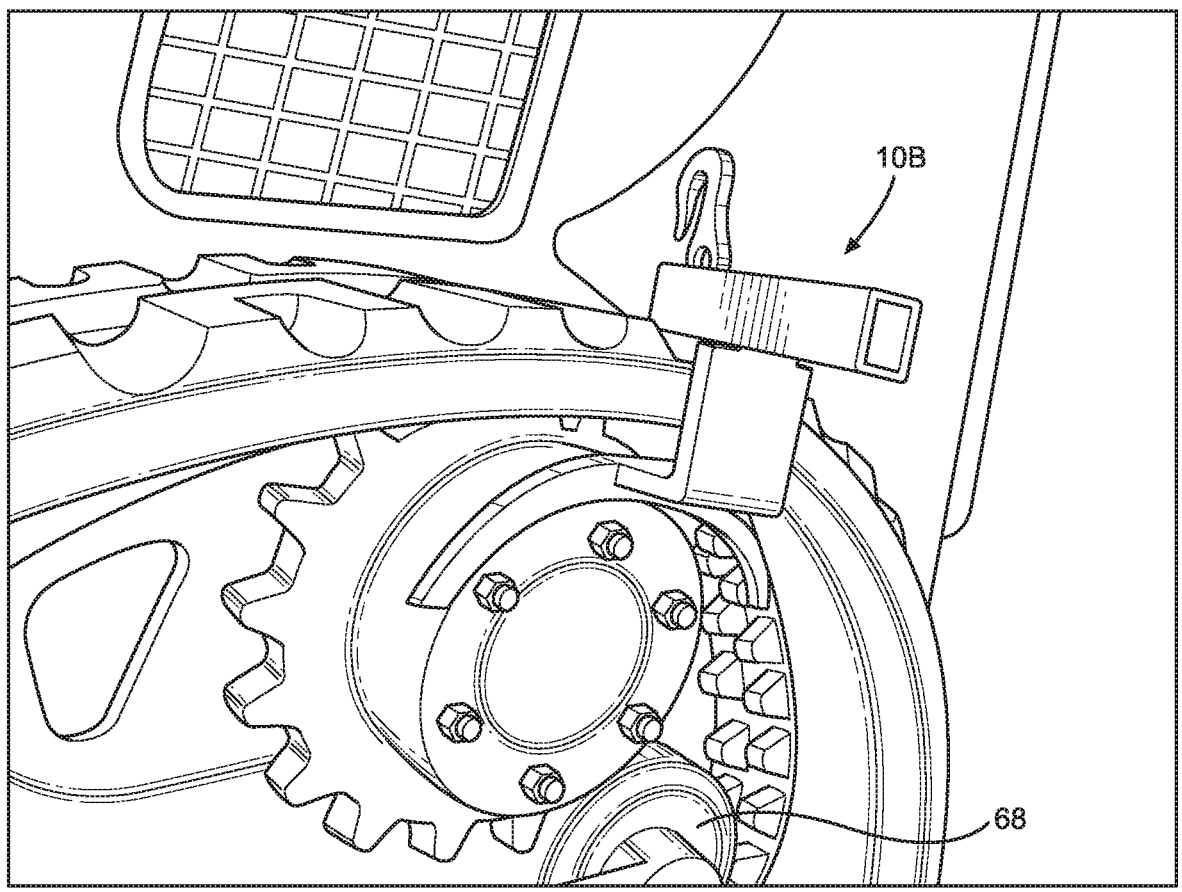

As best depicted in FIG. 16G, the arcuate plate end member 52, the L-shaped bracket 54, and the longitudinal track engagement member 56 are sized and dimensioned for bracketing and holding various sizes and dimensions of tracks therebetween along the tracks' depth dimension, i.e. a dimension encompassing a vertical measurement or gauge of the distance from the outermost surface of the ground-contacting, tread side lug surface of the track's rubber, to the bases of the inner surface's wheel guide projections and lugs, of the track during track placing operations, as will be further described hereinafter.

Although the preferred embodiment depicted in FIGS. 8-14 includes a longitudinal track engagement member 56, other structures are available for alternative embodiments that can include, but are not limited to, a hollow round tube, a hollow rectangular tube or the tube could be a solid member, if desired. It is understood that other polygonal shapes and modifications are contemplated, including but not limited to, a generally rectangular plate, a generally circular plate or disk, a bar, rod or rigid, flattened strip, and any other suitable structures that will remain securely fixed, dimensionally stable, and withstand the lifting point forces to which the apparatus and components are subjected from heavy duty lifting during track placement operations, while remaining within the scope of the present disclosure or appended claims, as will be appreciated by those skilled in the art, along with other benefits and advantages of the claimed invention.

A second interconnector element 58 is securely attached by welding to the upper top surface of the longitudinal track engagement member 56. One having ordinary skill in the art will recognize that the elements described herein with respect to the arcuate positioning member may be affixed together by welding or any suitable means, including but not limited to, riveting, screwing, brazing, or forming in one-piece construction as a unitary body without departing from the scope of the disclosed invention as claimed. The second interconnector element 58 is mounted to upper, proximal surface of longitudinal track engagement member 56 for temporary linking with a chain, link, sling, rigging, boom, or other desired connector, thereby providing a connection between a load and lifting gear, force-applying, and/or force-transferring elements for lifting, suspending, moving, hoisting, lowering, and/or applying or transferring a force to, the corresponding load.

In a preferred embodiment, the interconnector element includes a hook for manually connecting and disconnecting the interconnector elements thereby allowing faster and easier coupling and uncoupling of the apparatus and components from a continuous track during track removing, placing, and installing operations. The second interconnector element 58 further includes an enlarged basal hole 58B for providing a second attachment point for adjusting the effective length of a chain received in the first interconnector element 58 or for a receiving a chain link, clevis, shackle, linking assembly, rope, or other flexible connector.

The second interconnector element 58 is used for attaching to a chain and/or boom to lift thereby allowing a user to lift and disengage the track holes from sprocket wheel teeth. The L-shaped bracket 54 and the distal end arcuate plate member 52 are configured for lifting, holding and supporting a track to be placed, e.g. removed or installed, in an arc shape, and for carrying the track laterally in the arc shape for placement into position over a sprocket or an idler. As shown in FIG. 16F, in use conditions, the L-shaped bracket 54 vertically extending arm 54V inner surface aligns with the outer edge of the track 66. The horizontally extending arm 54H upwardly facing surface aligns with and supports a portion of the inner surface of the track 66 thereby allowing the arcuate plate member 52 to support a portion of the track 66 in an arc shape and for carrying, placing and fitting the track laterally into position and installing over a sprocket and/or an idler.

The opposite outer face 52O of distal end arcuate plate member 52 is a track interfacing surface to seat and exert a bias or force against the inside surface of a track. Opposite outer face 52O thus forms a generally continuous set of points which comprise a contact surface area which transfers and/or applies force to the inner surface of a continuous track. The contact surface area provided by opposite outer face 52O faces and is linearly spaced from the basal opening end 58B of the second interconnector member 58 and transfers and/or applies a force applied at a remote location, which may be the second interconnector member 58, to the contact surface area provided by the opposite outer face 52O, to thereby transfer and/or apply that force to the inner surface of the continuous track.

As shown in FIG. 15, the decoupling component 10C includes a substantially L-shaped member 60, which is preferably a bar or rod or of circular configuration, having a proximal end 60P and a distal end 60D which extends perpendicularly therefrom, thereby forming the L-shape for engaging with an inner surface of a track to be replaced or removed, as will be further described hereinafter. The proximal end 60P is securely fixed to the third interconnector element 62 by welding or any suitable means, including but not limited to, riveting, screwing, brazing, or forming in one-piece construction as a unitary body, without departing from the scope of the disclosed invention as claimed. The L-shaped member 60 is used for inserting into sprocket holes of a continuous track thereby allowing a user to lift and disengage the track 66 from sprocket wheel teeth, as will be further described hereinafter. In a first embodiment the L-shaped member may be fabricated of about 1" diameter rod; in alternative embodiments the diameter of the L-shaped member may be provided in a range, including but not limited to, of about 0.75" to about 1.25" diameter in order to provide a suitably sturdy decoupling component for use with different sizes and dimensions of tracks and track types. Although the preferred embodiment depicted in FIG. 15 includes an L-shaped member 60 of solid, circular configuration, those of skill in the art will understand that the L-shaped member could be of another geometrical configuration including, but not limited to, square, rectangular, hexagonal, octagonal, or other polygonal shape; or a solid or hollow member, including but not limited to, a hollow, polygonal member. Those of skill in the art will understand that other polygonal shapes and solid or hollow members may be used in forming the disclosed invention as claimed. One having ordinary skill in the art will recognize that the dimensions given are merely examples or models of one preferred form of the claimed invention, and these may vary in alternative embodiments, as the subject matter may be constructed in various sizes for placing various sizes and types of tracks. The provisions of size adjustability and other modifications are contemplated while remaining within the scope of the present disclosure or appended claims, as will be appreciated by those skilled in the art, along with other benefits and advantages of the present invention.

The third interconnector element 62 is mounted to upper, proximal surface of the substantially L-shaped member 60 for temporary linking with a chain, link, sling, rigging, boom, or other desired connector, thereby providing a connection between a load and lifting gear, force-applying, and/or force-transferring elements for lifting, suspending, moving, hoisting, lowering, and/or applying or transferring a force to, the corresponding load. The third interconnector element 62 may likewise include a cross-hole, cross-holes, or an enlarged basal hole to provide a second attachment point for adjusting the effective length of a chain received in the third interconnector element 62 or for a receiving a chain link, linking assembly, rope, or other flexible connector.

The surface of the L-shaped member 60 that faces the base end of the third interconnector member 62 is a track interfacing surface to exert a bias or force against the inside surface of a track. The surface of L-shaped member 60 thus forms a generally continuous set of points which comprise a contact surface area which transfers and/or applies force to the inner surface of a continuous track. The contact surface area provided by L-shaped member 60 faces and is linearly spaced from the base end of the third interconnector member 62 and transfers and/or applies a force applied at a remote location, which may be the third interconnector member 62, to the contact surface area provided by the L-shaped member 60, to thereby transfer and/or apply that force to the inner surface of the continuous track.

Preferably, the track placing system 10 track support and biasing apparatus 10A, arcuate positioning component 10B, and decoupling component 10C are made of steel, iron, aluminum, stainless steel, or any metal or metal alloy or composite suitable for heavy duty operations or tool-making, although other suitable hard and durable materials now known or hereinafter developed, may be used in forming the portions described herein. The selection of suitable materials based on known properties of specific weight, durability, toughness and strength would be within the ability of a person skilled in the art.

The components of the track removal and installation apparatus may be fabricated from any suitable durable, non-brittle, material, including formed, pressed, forged, cast and/or machined metal such as iron, steel, stainless steel or aluminum, or any combination thereof, suitable for heavy duty operations and exposure to worksite conditions encountered during demanding earth moving and construction operations. These materials are readily available and those in the art are familiar with working with such material. Other materials are available that would be suitable for alternative embodiments and components of the subject matter of the disclosure that provide uniform strength and stress distribution throughout the structure. The selection of suitable materials based on known properties of specific weight, durability, toughness and strength would be within the ability of a person skilled in the art. Those in the art will understand that any suitable material, now known or hereinafter developed, may be used in forming the components described herein. Those of skill in the art will understand that a number of variations may be made in the disclosed embodiments, all without departing from the scope of the invention, which is defined solely by the appended claims.

As best depicted in FIGS. 16C, 16D, 16E and 16F, the system and multicomponent apparatus may be employed with a worksite boom, beam, or rigid pole, for guiding, supporting, and transferring force to the system apparatus and components. Booms are readily available on worksites and those in the art are familiar with working with such devices. Booms are typically equipped with rigging, including but not limited to fittings, end attachments, mountings, supports, yokes, link connectors, and hooks for connecting to load handling devices or lifting gear to "swing out" in the known manner to extend the boom outwardly at various angles to a desired position for positioning or moving suspended loads, horizontally, vertically and laterally.

Turning now to FIGS. 16A-G, the system 10 functions as follows: To begin a process of replacing an original track with a replacement track on a work vehicle, the side of the vehicle on which the track 66 to be removed is raised. Typically, this can be accomplished by means of a jack, lift, crane, inflatable air bags or the like. The idlers may be retracted so as to be lowered or moved rearwardly to remove tension on the original track 66 and to provide clearance for biasing members 12, 14 to be inserted against the inner surface of the track 66 on either side of an idler wheel 68 which may be a front idler or a rear idler. In this example, the idler is a front idler wheel (not shown). The outer tubular member 22 and inner tubular member 26 are separated by removing the hex nut 32 and bolt 30, the leading portions of the inner side edges 12ISE, 14ISE of the arcuate biasing members 12, 14 are positioned such that the arcuate biasing members 12, 14 outer surfaces 12O, 14O are positioned against the inside surface of the track 66 at a location proximate the front idler, thus positioning the inner and outer tubular members 22, 26 against the front of the track outer surface proximal to the idler, the tubular members 22, 26 are rejoined such that the locking assembly 20 is positioning proximal to the track and the first interconnector element 34 extends longitudinally in a direction in line parallel with the wheel assembly. The locking bolt 30 is inserted through the pairs of aligned openings 24, 28 to secure the support and biasing apparatus 10A in place such that the arcuate biasing members 12, 14 are positioned into contact against the inner surface of the track 66, one on each side thereof. As shown in FIGS. 16A and 16B, a chain or other flexible linking member is attached to the first interconnector element 34; a force is then applied to the chain to cause the arcuate biasing members 12, 14 to bear against the inner surface of the track 60. In this example, the force applied includes a pulling force applied by securing the chain to a work element such as a lift arm of the same work vehicle, including but not limited to a front-loader backhoe, skid steer or compact loader, backhoe, excavator or any suitable vehicle. The pulling forcing may be a series of forces, each force in the series including, but not limited to, an upward, forward, or lateral force, or combinations thereof. The force may also be applied by the work element or lift arm of another work vehicle. The force may be applied in the directions as indicated by the arrows. After the track is disengaged from the idler, the track is then shifted laterally outwardly away from the vehicle using the lift arm. The first interconnector element 34 is detached or released from the chain, then the locking bolt 30 is removed and the locking assembly 20 is separated and the biasing apparatus 10A is released and removed from the track 66.

With the track 66 disengaged from the idlers, the track 66 is now disengaged from the sprocket wheel 70. To do this, the L-shaped member 60 of the decoupling component 10C is inserted manually into the continuous track 66 into one of the track sprocket holes, preferably adjacent sprocket wheel 70 at a position located above and just rearwardly of the uppermost sprocket wheel tooth. The distal end 60D of inserted L-shaped 60 member is extended through the sprocket hole and may be partially rotated in a manner such that perpendicular leg of L-shape engages and bears against inner surface of track 66. A chain or other flexible linking member is secured to the third interconnector element 62, and a lifting force is applied to the decoupling component 10C to lift and disengage the track from the uppermost tooth of the sprocket to clear the rollers and sprockets of the vehicle. In this example, the lifting force is applied by a boom secured to a work element such as a lift arm of another work vehicle, as shown in FIGS. 16C, 16D and 16E. The chain is then removed from the third interconnector element 62, the decoupling component 10C is removed and reinserted into a sprocket hole located proximate to the front idler, the chain is re-secured to the third interconnector element 62 and a lateral pulling force is applied vis the boom to remove the proximate portion of the track from the front idlers. This step is repeated for a sprocket hole proximal to the front idler, a sprocket hole distalmost to the rear idler, and/or for any other sprocket hole as desired, to finish levering the track off of the tracked wheel assembly and drag the track away from the vehicle. In operation, the decoupling component 10C engages the track 66 to not only lift a portion of the track 66, but also to pull the track 66. The track is generally heavy and stiffly resilient; thus, a tensioning force pulls the track back against the contact surface of the L-shaped member 60, which coacts to cause the upper part of the track 66 to lift upward thereby disengaging from the sprocket wheel teeth. The tensioning force has a horizontal and a vertical component, which is dependent upon where the decoupling component 10C is connected to the track 66. Thus, repositioning the L-shaped member in either of the upper, proximal, and distal sprocket holes thereby allows a different angle of tension to be applied to the track for any given position of the decoupling component 10C. After the upper portion of the track is disengaged from the drive sprocket wheel, the remaining front and rear portions are disengaged, and the original track 66 is removed from the vehicle. The third interconnector element 62 is then detached or released from the chain.

With removal of the original track from the vehicle, a new, replacement track may be now placed and installed on the vehicle. To do this, the second interconnector element 58 of the arcuate positioning component 10B is secured to the chain as illustrated in FIG. 16F, thereby allowing the arcuate positioning component 10B to be positioned such that the upwardly facing surface 52O aligns with and supports a portion of an inner surface of a new or a replacement track 66 to be installed; and such that the vertically extending arm 54V inner surface aligns with the outer edge of the new or replacement track to be installed, and such that the inner surface of the vertically extending arm 54V aligns with the outer edge of the new or replacement track, thereby allowing the arcuate plate member 52 to support and shape a portion of the inner surface of the replacement track in an arc shape and to laterally carry the replacement track by its supported portion into placement position, thereby fitting and installing the supported portion of the new track over the sprocket so as to be in alignment with the sprocket 70 and rear idler 68, as illustrated in FIG. 16G. The chain is then detached or released from the second interconnector element 58 and the boom may be used to urge or slide the track 66 under the bogies 72.

With the new track placed over the sprocket wheel 70 and rear idler 68, the track is now fitted over the front idlers (not shown). To do this, the support and biasing apparatus 10A locking assembly 20 is then connected to the proximal portion of the new track for installing this portion of this track over the front idlers, which are not visible in this depicted view of the process. This is achieved in the manner previously described heretofore, as best illustrated in FIG. 16A. The chain or flexible linking member which is secured to the work vehicle lift arm is secured to first interconnector element 34, a series of forces is applied to the support and biasing apparatus 10A, each force in the series comprising at least one of an upward, forward or lateral force, or combinations thereof, to thereby urge and place the new or replacement track into proper alignment and captive engagement with the front idler (not shown). After such secure mating engagement is achieved, the first interconnector element 34 is detached or released from the chain and the locking assembly is unlocked and removed in the manner previously described. Once the new track is properly positioned onto the wheel assembly, the sprocket wheel 70 may be rotated in such a manner for the sprocket teeth to "catch" or engage or the track sprocket holes, if desired; the idlers are extended to apply tension to the track, and the vehicle is lowered into position for operation. Installation of a new or replacement track is now achieved by the present disclosure in a fraction of the time and with substantially less manpower than previously proposed solutions and methods. The system and apparatus may be employed on pavement or rough terrain at a field or job location or where limited personnel are available to provide a safe, versatile, efficient, and economical system and apparatus for removing, placing, and installing a continuous track on power machines, particularly work vehicles including excavators, loaders, crawlers, tractors, and other tracked heavy equipment machines.

Although this process has been described with its preferred embodiment(s), it is noted that equivalents may be employed and substitution made herein without departing from the scope of the subject matter or the appended claims. It is understood that such description is simply for descriptive purposes, and that embodiments of the present disclosure may be used to remove and install tracks on a variety of wheel assemblies on various power machines and work vehicles.

It will be appreciated that the above description relates to a specific embodiment of the invention, provided by way of example only. A number of variations are possible, and would be obvious to those of ordinary skill in the art. Such obvious variations are within the scope of the invention as defined and claimed, whether or not expressly recited. Although specific arrangements are shown in the exemplary embodiment, any suitable structures, attachments or mechanisms can be employed to perform the function recited herein; neither the present disclosure nor the appended claims are limited to the specific arrangements or embodiments shown in the Drawings. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims. The terms "including" and "having" as used in the specification and claims shall have the same meaning as the term "comprising."

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

I claim:

1. A system comprising: a continuous track work vehicle, the continuous track work vehicle comprising a track, the track positioned over an idler roller, wheel, or sprocket comprised by the continuous track work vehicle: a biasing apparatus that engages with the track, the biasing apparatus comprising: a first arcuate biasing member comprising a first co-terminus flange, the first co-terminus flange comprising: a first terminal lip; a first annular groove formed inboard of the first terminal lip; and a first raised rib inboard of the first annular groove; and a second arcuate member; a decoupling component, the decoupling component comprising: an L-shaped bar; and a first interconnector element, a proximal end of the L-shaped bar securely fixed to the first interconnector element, the first interconnector element constructed to temporarily link the decoupling component with a first chain, link, sling, rigging, a first boom, or other connector, thereby coupling the decoupling component with the lift gear, force-applying, and/or force-transferring elements to bias the track when the track is coupled to the decoupling component; wherein: a surface of the L-shaped bar that faces a base end of the first interconnector element is a track interfacing surface configured to exert a bias or force against an inside surface of the track when coupled thereto and when coupled to the continuous track work vehicle, the decoupling component is constructed to lift and disengage the track from an uppermost tooth of at least one sprocket of the continuous track work vehicle; and the first co-terminus flange engages and supports a portion of the track and is constructed to carry and fir the track laterally onto position over the idler roller, wheel, or sprocket.

2. The system of claim 1, wherein:
the biasing apparatus comprises a second interconnector element, the second interconnector element coupleable to a second boom, beam, or rigid pole, the second, interconnector element coupled to the first arcuate biasing member via a first apertured side and a first connector plate, wherein bias is applied to the track via the second interconnector element.

3. The system of claim 1, wherein:
the second arcuate member comprises a second co-terminus flange, the second co-terminus flange comprising:
a second terminal lip;
a second annular groove formed inboard of the second terminal lip; and
a second raised rib inboard of the second annular groove; and
wherein, the second co-terminus flange that engages and supports a second portion of the track and is constructed to carry and fit the track laterally into position over the idler roller, wheel, or sprocket.

4. The system of claim 1, further comprising:
an arcuate positioning component, the arcuate positioning component comprising:
a second interconnector element, the second interconnector element constructed to temporarily link the arcuate positioning component with a second chain, link, sling, rigging, second boom, or other connector, thereby coupling the arcuate positioning component with lifting gear, force-applying, and/or force-transferring elements to bias the track when the track is coupled to the arcuate positioning component;
an arcuate plate end member;
a longitudinal track engagement member, the longitudinal track engagement member securely attached by welding to the second interconnector element; and
a mounting bracket, the mounting bracket extends between the arcuate plate end member and the longitudinal track engagement member.

5. The system of claim 1, wherein:
the first interconnector element a cross-hole, cross-holes, or an enlarged basal hole to provide an attachment point for adjusting an effective length of a second chain received in the first interconnector element or for a receiving a chain link, linking assembly, rope, or other flexible connector.

* * * * *